United States Patent [19]

Kobayashi et al.

[11] Patent Number: 4,915,546

[45] Date of Patent: Apr. 10, 1990

[54] DATA INPUT AND PROCESSING APPARATUS HAVING SPELLING-CHECK FUNCTION AND MEANS FOR DEALING WITH MISSPELLED WORD

[75] Inventors: Norio Kobayashi; Naohisa Kaneko; Akemi Nagatsuna, all of Nagoya, Japan

[73] Assignee: Brother Kogyo Kabushiki Kaisha, Aichi, Japan

[21] Appl. No.: 90,364

[22] Filed: Aug. 28, 1987

[30] Foreign Application Priority Data

Aug. 29, 1986 [JP] Japan .................................. 61-203969
May 19, 1987 [JP] Japan .................................. 62-122225

[51] Int. Cl.$^4$ .................................................. B41J 50/30
[52] U.S. Cl. ........................................ 400/697; 400/63; 400/74
[58] Field of Search ....................... 400/63, 74, 697; 364/419

[56] References Cited

U.S. PATENT DOCUMENTS 3,780,846 12/1973 Kolpek et al. .................... 400/63
3,995,254 11/1976 Rosenbaum .............. 340/146.3 ND
4,041,467 8/1977 Cota et al. ....................... 364/900

(List continued on next page.)

FOREIGN PATENT DOCUMENTS 60544   9/1982 European Pat. Off. .............. 400/63
134491 10/1980 Japan ................................... 400/63
57-41738 9/1982 Japan .
59-26280 2/1984 Japan .
124270  7/1985 Japan .................................. 400/63

OTHER PUBLICATIONS

Hebert et al., "Special Search Function", IBM Technical Disclosure, vol. 21, No. 11, pp. 4365-4366, 4-79.
V. A. Mayfield, "8-Bit Character Encoding for Multiple Languages", *IBM Technical Disclosure Bulletin*, vol. 26, No. 2, Jul. 1983, p. 537.
P. S. Cohen et al., "Video Disc Dictionary System", *IBM Technical Disclosure Bulletin*, vol. 25, No. 8, Jan. 1983, p. 4209.
T. L. Adam et al., "Spelling, Processing Functions Operator Interface", *IBM Technical Disclosure Bulletin*, vol. 24, No. 10, Mar. 1982, pp. 5003-5008.
R. Hackett, "Spelling Checking Typewriter", *IBM Technical Disclosure Bulletin*, vol. 18, No. 2, Jul. 1975, pp. 530-531.
B. A. Barker et al., "Method for Detecting and Correcting Selected Word Spelling Errors in a Text Processing System", *IBM Technical Disclosure Bulletin*, vol. 25, No. 8, Jan. 1983, p. 4225.
I. H. Hernandez et al., "Interactive Spelling Correction Aid for a Text Processing System", *IBM Technical Disclosure Bulletin*, vol. 25, No. 8, Jan. 1983, pp. 4227-4228.
D. Wendel et al., "Using the on Mode", *CPT Spelling Checker I*, Mar. 1983, 4 pages.

*Primary Examiner*—William Pieprz
*Attorney, Agent, or Firm*—Oliff & Berridge

[57] ABSTRACT

A data input and processing apparatus as used in a typewriter, having a function of checking the spelling of entered words which are separated by word-separation data such as a space or a period. The apparatus has a device for inhibiting an operation defined by the word-separation data, e.g., a spacing movement to the next word, if the spelling-check device finds a misspelled word. Where there exists at least one numeral and/or symbol preceding or following the entered word, the numeral and/or symbol are ignored in checking the spelling of the entered data. When a misspelled word is found, the entered word is first erased, and then at least one candidate word which replaces the mispelled word is presented to the operator. The apparatus may have a plurality of operation modes including a candidate indication mode for displaying the candidate word, an ignoring mode for ignoring a misspelling alarm, a retyping mode for re-entering a correct word, and a correction mode in which the misspelled word is corrected in part by changing and/or deleting the characters.

25 Claims, 11 Drawing Sheets

U.S. PATENT DOCUMENTS

| | | | |
|---|---|---|---|
| 4,136,395 | 1/1979 | Kolpek et al. | 400/63 |
| 4,198,906 | 4/1980 | Fujikawa et al. | 400/74 |
| 4,218,760 | 8/1980 | Levy | 364/419 |
| 4,323,315 | 4/1982 | Demonte et al. | 400/63 |
| 4,328,561 | 5/1982 | Convis et al. | 364/900 |
| 4,339,806 | 7/1982 | Yoshida | 364/900 |
| 4,355,371 | 10/1982 | Convis et al. | 364/900 |
| 4,383,307 | 5/1983 | Gibson, III | 364/419 |
| 4,408,302 | 10/1983 | Fessel et al. | 364/900 |
| 4,413,318 | 11/1983 | Herrington | 364/200 |
| 4,420,817 | 12/1983 | Yoshida | 364/900 |
| 4,438,505 | 3/1984 | Yanagiuchi et al. | 364/900 |
| 4,439,836 | 3/1984 | Yoshida | 364/419 |
| 4,456,969 | 6/1984 | Herzik et al. | 364/419 |
| 4,467,446 | 8/1984 | Sakurai | 364/419 |
| 4,498,148 | 2/1985 | Glickman | 364/900 |
| 4,499,553 | 2/1985 | Dickinson et al. | 364/900 |
| 4,502,128 | 2/1985 | Okajima et al. | 364/419 |
| 4,503,426 | 3/1985 | Mikulski | 400/63 |
| 4,503,514 | 3/1985 | Urquhart | 364/900 |
| 4,548,520 | 10/1985 | Ueno | 400/63 |
| 4,559,598 | 12/1985 | Goldwasser et al. | 364/900 |
| 4,564,301 | 1/1986 | Ueno | 400/63 |
| 4,567,573 | 1/1986 | Hashimoto et al. | 364/419 |
| 4,580,241 | 4/1986 | Kucera | 400/63 |
| 4,584,667 | 4/1986 | Hashimoto et al. | 364/900 |
| 4,590,560 | 5/1986 | Sado | 364/419 |
| 4,594,686 | 6/1986 | Yoshida | 364/419 |
| 4,611,995 | 9/1986 | Sado | 364/419 |
| 4,651,300 | 3/1987 | Suzuki et al. | 364/900 |
| 4,655,620 | 4/1987 | Adams et al. | 400/63 |
| 4,671,684 | 6/1987 | Kojima et al. | 400/63 |

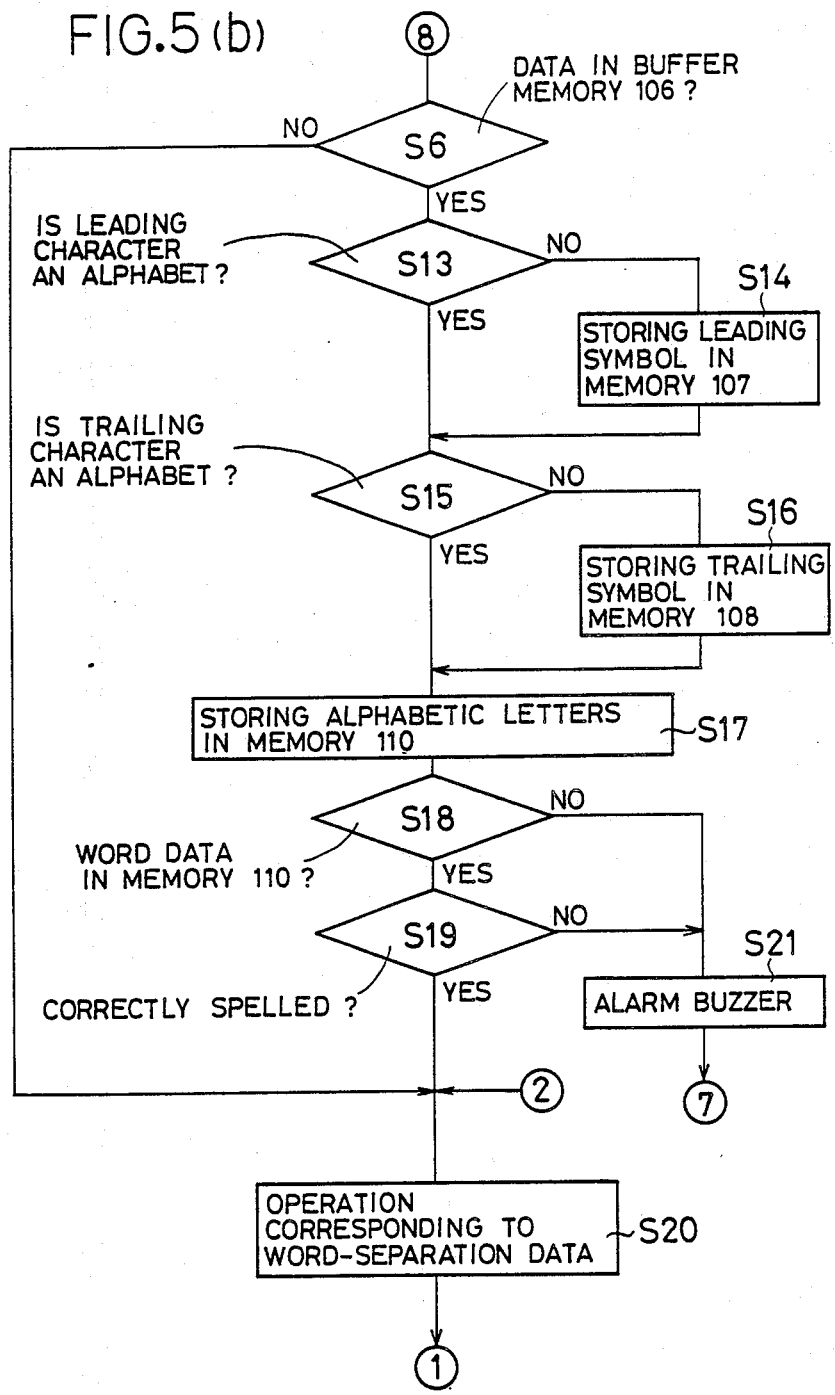

FIG.9

```
SP  MISSPELLED WORD: [Ahapter]
CANDIDATE: [Chap] [Chapter] [Character] [Aha]
MENU: IGNORE RETYPE CANDIDATE AMEND
```

FIG.10

```
SP  MISSPELLED WORD: gotango
CANDIDATE: Not found
MENU: IGNORE RETYPE CANDIDATE AMEND
```

DATA INPUT AND PROCESSING APPARATUS HAVING SPELLING-CHECK FUNCTION AND MEANS FOR DEALING WITH MISSPELLED WORD

BACKGROUND OF THE INVENTION

1. Field of the Invention

The present invention relates generally to a data input and processing apparatus having a spelling-check function, and more particularly to means for dealing with detected misspelling of entered character data.

2. Discussion of the Prior Art

There is known a typewriter which is capable of detecting the misspelling of a word printed based on keyed-in character data, and presenting to the operator at least one candidate word which can be substituted for the misspelled word. This type of typewriter includes (a) printing means for printing character data entered through a keyboard, (b) memory means for storing the entered character data, (c) spelling-check means operable upon entry of word-separation data such as a space or period indicative of termination of a word, for checking to see whether a word represented by the character data stored in the memory means is misspelled or not, and (d) candidate indicator means responsive to the spelling-check means, for presenting at least one candidate word which can replace the printed word which is detected as a misspelled word by the spelling-check means. If one of the at least one candidate word presented by the candidate indicator means is selected, the printed misspelled word is erased, and the selected candidate word is printed in place of the erased misspelled word. This arrangement is advantageous, requiring reduced efforts of the operator to correct the misspelled word.

In the typewriter indicated above, however, the desired candidate word replacing the misspelled word must be selected before the misspelled word is erased. This leads to lowering the data correcting or printing efficiency. Described more specifically, since the erasure of the misspelled word requires considerable time, it is more efficient to first initiate the erasure of the detected misspelled word, for giving the operator more time for considering selection of one of the presented candidate words, during the erasure of the misspelled word, than to urge the operator to first select the desired candidate word prior to the initiation of the erasure of the misspelled word.

Further, once the erasure of the misspelled word is started, the operator cannot manipulate the typewriter until the erasure of the misspelled word and the printing of the candidate word are completed. This arrangement is inconvenient. Namely, the erasure of the misspelled word and the printing of the candidate word require a relatively long time, during which the operator may change his or her mind, desiring to print a candidate word different from that one selected. Thus in the prior art, the newly selected word must be printed only after the initially selected word has been printed and then erased, since it is necessary that the selected word is printed.

The typewriter discussed above is further adapted such that an operation corresponding to a word-separation key such as a space key, a carriage return key or a tab key, is started as soon as the word-separation key is operated, even where an entered word terminated by the operated word-separation key is detected as a misspelled word. In this arrangement, the correction of the misspelled word requires the carriage to be moved back to the position of the misspelled word.

The carriage may be rapidly returned to the position of the misspelled word if the typewriter has a memory for storing the position of the last printed word. However, if the typewriter does not have such a memory, it requires a relatively long time for the carriage to return to the position of the misspelled word. For example, if the carriage return key is operated, the carriage must be returned to the misspelled word by operating the backspace key, and the paper must be fed back to the previous line by operating the paper reverse-feed key, since the position of the misspelled word is not stored in a memory. Thus, the correction of the misspelled word requires a cumbersome procedure.

Further, if the word-separation key such as the symbol key corresponding to a comma or period is operated to terminate a word detected as a misspelled word due to lack of a character or addition of an unnecessary character, the printed comma or period must be erased and re-printed at a different position, since the insertion of a new character or the deletion of the unnecessary character to correct the misspelled word results in the shifting of the comma or period for the corrected word. This also increases the time and effort required to correct the misspelled word followed by a comma or period, for example.

SUMMARY OF THE INVENTION

It is an object of the present invention to provide an electronic typewriter, which is capable of erasing misspelled or erroneously entered character data as in the form of a word, before presenting a candidate or candidates to be substituted for the erroneous entry.

The above object may be attained according to one aspect of the present invention, which provides a typewriter comprising: (a) a keyboard having character keys for entering character data indicative of characters, and word-separation keys for entering word-separation data indicative of termination of word entry, the word-separation keys including a space key for spacing adjacent words from each other, and a symbol key corresponding to a period; (b) printing means for printing the characters entered through the keyboard; (c) memory means for storing entered data entered through the keyboard, the entered data including the character data; (d) a dictionary memory storing word data indicative of a multiplicity of words; (e) spelling-check means responsive to the word-separation data, for determining whether or not the dictionary memory stores the word data indicative of an entered word represented by the character data stored in the memory means, and for thereby determining whether or not a spelling of the entered word is correct; (f) candidate search means for retrieving from the dictionary memory at least one candidate word which replaces the entered word; (g) commanding means for actuating the candidate search means to retrieve the above-indicated at least one candidate word, after the spelling-check means determines that the spelling of the entered word is not correct; (h) erasing means responsive to the commanding means, for erasing the entered word which has been printed by the printing means; and (i) selector means operable after erasure of the entered word by the erasing means is started, for selecting one of the above-indicated at least one candidate word retrieved by the candidate search means.

In the typewriter constructed as described above, when the spelling-check means determines that the spelling of the entered word is not correct, the commanding means actuates the candidate search means to retrieve at least one candidate word, and at the same time the erasing means is actuated to erase the printed misspelled word. After the actuation of the erasing means, the selector means is operable for enabling the operator to select one of the at least one candidate words retrieved by the candidate search means.

Thus, the typewriter according to the invention permits the operator to select the desired candidate word presented by the candidate search means after the erasing operation of the printed misspelled word is started. In other words, the operator can determine, during the erasing operation, which one of the presented candidate words is suitable to replace the misspelled word. Therefore, the time spent in erasing the misspelled word can be effectively utilized, and operating efficiency can be improved over that of the conventional arrangement.

The above arrangement of the invention is contrary to the conventional arrangement in which the selection of one of the candidate words precedes the erasure of the misspelled word. If the operator wishes to change the selected candidate word to another, the first selected candidate word which has been printed following the erasure of the misspelled word must be erased, before the second selected candidate is printed. In the typewriter of the invention, the erasing means is actuated in response to the activation of the candidate search means, to start erasing the misspelled word before the selector means becomes operable to permit the operator to select the desired candidate word. Hence, the operator may change his or her mind in selecting the desired candidate word, without printing a first candidate-word which the operator initially thinks to select, before the second or finally selected candidate word is printed.

According to one feature of the above aspect of the invention, the character keys include letter keys for entering letter data indicative of letters, attribute keys for entering attributes such as capitalization, bold or other modification to letters, numerals, etc. and numeral and/or symbol keys, separate from the attribute keys for entering numeral and/or symbol data indicative numerals and/or symbols, and the typewriter further comprises word-data retrieval means. Where the entered data stored in the memory means and terminated by the word-separation data includes the numeral and/or symbol data which precedes and/or follows the letter data, the word-data retrieval means retrieves only the letter data from the memory means, and the spelling-check means determines whether or not the spelling of the entered word represented by the letter data is correct.

In one form of the above feature of the invention, the typewriter further comprises misspelled-word indicator means for displaying, if the spelling-check means determines that the spelling of the entered word is not correct, the entered word as a misspelled word, together with at least one numeral and/or symbol represented by the numeral and/or symbol data.

In another form of the above feature of the invention, the typewriter further comprises candidate indicator means for displaying the above-indicated at least one candidate word retrieved by the candidate search means, together with at least one numeral and/or symbol which precedes and/or follows the at least one candidate word, if the entered data stored in the memory means includes the numeral and/or symbol data.

In a further form of the same feature of the invention, the printing means is operable to re-print the one of the above-indicated at least one candidate word retrieved by the candidate search means, together with at least one numeral and/or symbol which precedes and/or follows the above-indicated one of the at least one candidate word word, if the entered data stored in the memory means includes the numeral and/or symbol data.

According to another feature of the above aspect of the invention, the typewriter further comprises inhibiting means responsive to the spelling-check means, for inhibiting an operation defined by the word-separation data, if the spelling-check means determines that the spelling of the entered word is not correct.

According to a further feature of the same aspect of the invention, the typewriter further comprises mode selecting means for selecting, when the spelling-check means determines that the spelling of the entered word is not correct, one of at least two modes selected from the group which includes (i) an ignoring mode in which the spelling-check means is ignored and an operation to enter a next word is permitted, (ii) a retyping mode in which the entered word is replaced by a correct word all characters of which are re-entered through the keyboard, (iii) an amending mode in which the entered word is corrected by changing and/or deleting at least one of the characters of the last word and/or by adding at least one character to the entered word, through the keyboard, and (iv) a candidate indication mode in which the above-indicated at least one candidate word retrieved by the candidate search means is displayed on candidate indicator means, In this case, the candidate search means is operated when the candidate indication mode is selected.

It is another object of the invention to provide an electronic typewriter which is operable in a plurality of modes for dealing with a detected misspelled entry or word.

The above object may be achieved according to another aspect of the present invention, which provides a typewriter comprising: (a) a keyboard having character keys for entering character data indicative of characters, and word-separation keys for entering word-separation data indicative of termination of entry of a word, the word-separation keys including a space key for spacing adjacent words from each other, and a symbol key corresponding to a period; (b) printing means for printing the characters entered through the keyboard; (c) memory means for storing entered data entered through the keyboard, the entered data including the character data; (d) a dictionary memory storing word data indicative of a multiplicity of words; (e) spelling-check means responsive to the word-separation data, for determining whether or not the dictionary memory stores the word data indicative of an entered word represented by the character data stored in the memory means, and for thereby determining whether or not a spelling of the entered word is correct; (f) alarm means for informing an operator of the typewriter that the entered word is misspelled, if the spelling-check means determines that the spelling of the entered word is not correct; and (g) mode selecting means operable if said spelling-check means determines that the spelling of the entered word is not correct, said mode selector means selecting one of at least two modes selected from the group which includes (i) an ignoring mode in which the alarm means is ignored and an operation defined by the word-separation data is effected, (ii) a retyping mode in which the entered word is replaced by a correct word all characters of which are re-entered through the keyboard, (iii) an amending mode in which the entered word is corrected by changing and/or deleting at least one but not all of the characters of the entered word, and/or by adding at least one character to the entered word, through the keyboard, and (iv) a candidate indication mode in which the above-indicated at least one candidate word which replaces the entered word is displayed on candidate indicator means.

In the typewriter constructed as described above, the operator may select a desired one of at least two modes from the four different operating modes indicated above, which are provided for dealing with different situations in which the spelling-check means determines that the entered word is a misspelled word. For instance, the ignoring mode is selected when the misspelled word detected by the spelling-check means is a proper noun or name which is not stored in the dictionary memory. The candidate indication mode is selected when the misspelling of the misspelled word is only slightly different from the spelling of the correct word, or when the operator believes that the dictionary memory stores the correct word that replaces the misspelled word. Further, the retyping and amending modes are selected depending upon the relation between the misspelling of the entered word, and the spelling of the correct word. For instance, the amending mode is selected when the misspelled word can be corrected by simply adding a character to the entered word. Thus, the instant typewriter provides improved printing efficiency, more particularly, improved data correcting or editing efficiency.

According to one feature of the above aspect of the invention, the mode selector means is operable to change the selected one of the above-indicated at least two modes to another, for example, from the retyping mode to the candidate indication mode.

According to another feature of the above aspect of the invention, the spelling-check means is operable in a spelling-check mode, and the typewriter further comprises cancelling means for cancelling the spelling-check mode after the mode selector means has selected one of the above-indicated at least two modes.

According to a further feature of the same aspect of the invention, the above-indicated at least two modes includes the amending mode, and the typewriter further comprising: misspelled-word indicator means for displaying the entered word as a misspelled word, if the spelling-check means determines that the spelling of the entered word is not correct, the misspelled-word indicator means having a cursor; and means for automatically moving the cursor to a first charcacter of the misspelled word on the misspelled-word indicator means, when the mode selector means selects the amending mode.

According to a still further feature of the same aspect of the invention, the above-indicated at least two modes includes the amending mode, the typewriter further comprising: misspelled-word indicator means for displaying the entered word as a misspelled word, if the spelling-check means determines that the spelling of the entered word is not correct, the misspelled-word indicator means further displaying a corrected word obtained as a result of correcting the misspelled word in the amending mode, the misspelled-word indicator having a cursor; erasing means for erasing the entered word printed by the printing means; and commanding means for activating the printing means to print the corrected word, when a printing key on the keyboard is operated while the cursor is positioned at one of characters of the corrected word displayed on the misspelled-word indicator means.

According to a yet further feature of the same aspect of the invention, the above-indicated at least two modes includes the candidate indication mode, and the typewriter further comprises: candidate search means for retrieving from the dictionary memory at least one candidate word which replaces the entered word and which is displayed on the candidate indicator means; and resetting means for restoring the mode selector means to a condition in which the mode selector means may select any one of the above-indicated at least two modes, if the dictionary memory does not store the above-indicated at least one candidate word.

It is a further object of the present invention to provide a data input and processing apparatus wherein an operation corresponding to an operated word-separation key is inhibited if a word or succession of characters terminated by the operated word-separation key is detected as a misspelled entry.

The above object may be attained according to a further aspect of the present invention, which provides a data input and processing apparatus, comprising: (a) akeyboard having a plurality of keys operable for entering character data indicative of characters, and word-separation data indicative of termination of entry of a word; (b) memory means for storing at least one set of entered word data indicative of words represented by the character data entered through the keyboard; (c) a dictionary memory storing word data indicative of a multiplicity of words; (d) spelling-check means responsive to the word-separation data entered through the keyboard, for determining whether or not the dictionary memory stores the word data which is identical with the entered word data of a last word in the memory means which is entered last prior to the entry of the word-separation data, and for thereby determining whether or not a spelling of an entered word is correct; and (e) inhibiting means responsive to the spelling-check means, for inhibiting an operation defined by the word-separation data if the spelling-check means determines that the spelling of the entered word is not correct.

In the data input and processing apparatus constructed as described above, the word data entered through the keyboard is temporarily stored in the memory means, and the entered word data stored in the memory means is checked for correctness of its spelling, by the spelling-check means which determines whether the dictionary memory stores the word data identical with the entered word data. If the spelling-check means determines that the spelling of an entered word represented by the entered word data is not correct, the inhibiting means is operated to inhibit operation defined by the word-separation data which terminates the entered misspelled word.

The instant data input and processing apparatus is adapted such that the word-separation operation corresponding to the word-separation data will not be implemented if the entered word is determined as a misspelled word. In the case where the apparatus is used for a typewriter having word-separation keys such as a carriage return key, and symbol keys indicative of a comma and a period, for example, a return movement of the carriage of the typewriter to the first column of the next line on recording paper, or the printing of the comma or period on the paper, will not occur if the entered word is misspelled. Consequently, it is not necessary to move the carriage back to the misspelled word and feed back the paper to the last printed line, for correcting the misspelled word, if the word-separation key operated to terminate the misspelled word is the carriage return key. Further, since the period or comma is not printed, it is not necessary to erase the printed period or comma for correcting the misspelled word, as required in the conventional arrangement. Thus, the instant data input and processing apparatus assures easy and fast correction of the erroneously entered data, or the misspelled word if printed by a printer of a typewriter, for example.

According to one feature of the above aspect of the invention, the data input and processing apparatus further comprises: correcting means for correcting the entered word if the spelling-check means determines that the spelling of the entered word is not correct; and means for effecting the operation defined by the word-separation data, after the misspelled entered word is corrected by the correcting means.

According to another feature of the same aspect of the invention, the apparatus further comprises ignoring means for ignoring the spelling-check means and effecting the operation defined by the word-separation data, even if the spelling-check means determines that the spelling of the entered word is not correct. In one form of this feature of the invention, the ignoring means is operated when any one of the keys for entering the word-separation data is operated after the spelling-check means determines that the spelling of the entered word is not correct.

According to a further feature of the same aspect of the invention, the keyboard has a plurality of word-separation keys for entering the word-separation data, and the spelling-check means is operated when one of the word-separation keys is operated, and the data input and processing apparatus further comprises means for effecting the operation defined by the word-separation data, when the one of the word-separation keys is operated after the spelling-check means determines that the spelling of the entered word is not correct.

According to a still further feature of the above aspect of the invention, the apparatus further comprises mode selecting means for selecting, when the spelling-check means determines that the spelling of the entered word is not correct, one of at least two modes selected from the group which includes (i) an ignoring mode in which the spelling-check means is ignored and the operation defined by the word-separation data is effected, (ii) a retyping mode in which the entered word is replaced by a correct word all characters of which are re-entered through the keyboard, (iii) an amending mode in which the entered word is corrected by changing and/or deleting at least one of the characters of the entered word, and/or by adding at least one character to said entered word, through the keyboard, and (iv) a candidate indication mode in which at least one candidate word which replaces the entered word is displayed on candidate indicator means.

It is a still further object of the present invention to provide a data input and processing apparatus which is capable of performing a spelling-check operation of a series of character data indicative of successive characters which are preceded and/or followed by numeral and/or symbol data indicative of at least one numeral and/or symbol.

The above object may be achieved according to a still further aspect of the present invention, which provides a data input and processing apparatus for processing input data, comprising: (a) a keyboard having a plurality of keys for entering letter data indicative of letters, attributes independent of numeral and/or symbol data, and numeral and/or symbol data indicative of numerals and/or symbols; (b) memory means for storing entered data entered through the keyboard, said entered data including numeral and/or symbol data which precedes and/or follows a series of character data indicative of successive characters; (c) a dictionary memory storing multiple sets of character data indicative of multiple groups of characters; and (d) spelling-check means for discarding said numeral and/or symbol data of the entered data which precedes and/or follows the above-indicated series of character data, and determining whether or not the dictionary memory stores the set of character data which is identical with said series of character data, thereby determining whether or not a spelling of said series of character data is correct.

In the typewriter constructed as described above, it is possible to effect an spelling-check operation for only a selected portion of the entered data, which is a remainder left after discarding the leading and/or trailing numeral and/or symbol data which precedes and/or follows a series of character data. For instance, th spelling-check operation may be effected for only an intermediate portion of the entered character data, e.g., for only a succession of characters which is preceded by a bracket symbol "[" and followed by a bracket symbol "]". In this case, the succession of characters need not be a succession of letters. For example, the succession of characters may include a hyphen.

According to one feature of the above aspect of the invention, the dictionary memory stores multiple sets of word data indicative of a multiplicity of words, and the above-indicated series of character data is a series of letter data indicative of successive letters of a word. In this case, the spelling-check means determining whether or not the dictionary memory stores the set of word data which is identical with the above-indicated series of letter data, and thereby determines whether or not the spelling of an entered word represented by the series of letter data is correct.

In one form of the above feature of the invention, the apparatus further comprises misspelled-word indicator means for displaying, if the spelling-check means determines that the spelling of the entered word is not correct, the entered word as a misspelled word, together with the numeral and/or symbol which is represented by the discarded numeral and/or symbol data.

In another form of the above feature of the invention, the apparatus further comprises candidate search means for retrieving from the dictionary memory at least one candidate word which replaces the misspelled word, and candidate indicator means for displaying the above-indicated at least one candidate word, together with the one numeral and/or symbol which is represented by the discarded numeral and/or symbol data, if the entered data stored in the memory means includes the numeral and/or symbol data.

According to a further form of the same feature of the invention, the keyboard has at least one word-data separation key for entering word-separation data indicative of termination of entry of a word, and the spelling-check means is operated in response to the word-separation data. The data input and processing apparatus further comprises inhibiting means responsive to the spelling-check means, for inhibiting an operation defined by the word-separation data if the spelling-check means determines that the spelling of the entered word is not correct.

According to a still further form of the same feature of the invention, the apparatus further comprises mode selecting means for selecting, when the spelling-check means determines that the spelling of the entered word is not correct, one of at least two modes selected from the group which includes (i) an ignoring mode in which the spelling-check means is ignored and an operation to enter a next word is permitted, (ii) a retyping mode in which the entered word is replaced by a correct word all characters of which are re-entered through the keyboard, (iii) an amending mode in which the entered word is corrected by changing and/or deleting at least one of the characters of the last word, and/or by adding at least one character to the entered word, through the keyboard, and (iv) a candidate indication mode in which at least one candidate word which replaces the entered word is displayed on candidate indicator means.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which:

FIG. 5(a) through FIG. 5(c), and FIGS. 6 through 8 are flow charts showing an operation of the typewriter according to control programs stored in a program memory shown in FIG. 4, which are closely associated with the principle of the present invention;

FIG. 9 and FIG. 10 are illustrations of a display of the typewriter, showing examples of information provided thereon.

DETAILED DESCRIPTION OF THE PREFERRED EMBODIMENTS

Figure 1:
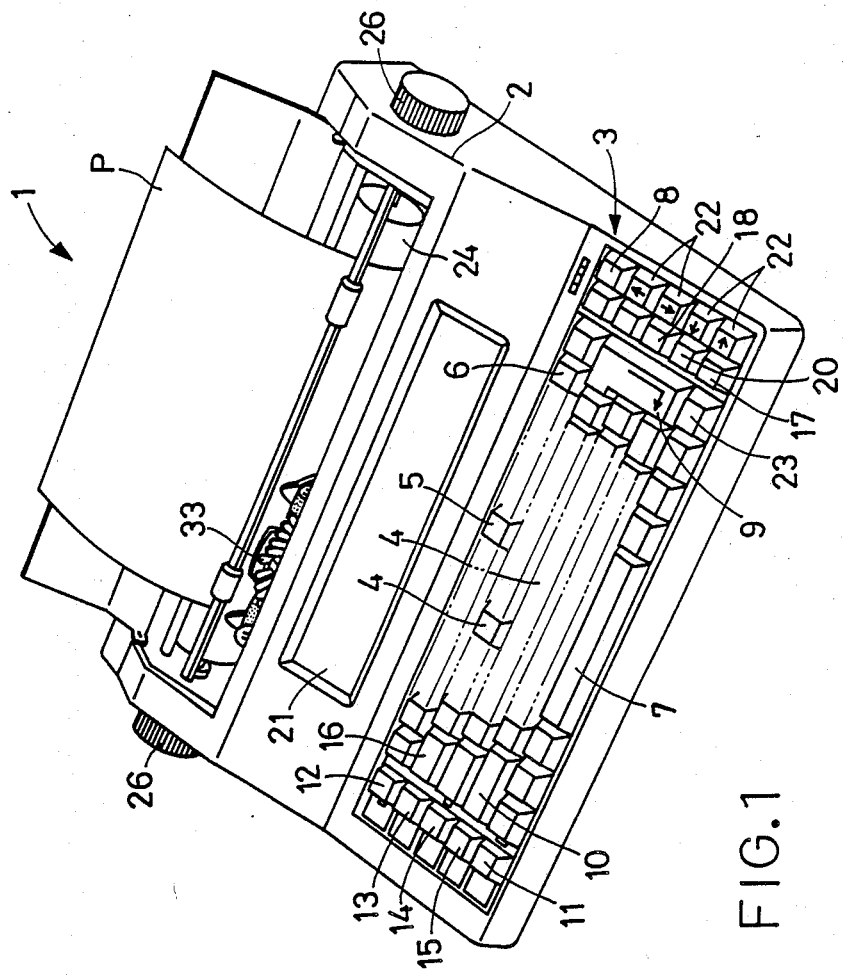
FIG. 1 is a perspective view showing an external appearance of one embodiment of a typewriter of the present invention.

Referring first to FIG. 1, there is shown a typewriter generally indicated at 1. The typewriter 1 has a main frame 2 whose front portion accommodates a keyboard 3, and whose rear portion accommodates a printing mechanism.

The keyboard 3 has various keys which include: character keys 4, 5, 6 consisting of letter keys 4 corresponding to alphabetic letters, numeral keys 5 corresponding to numerals or digits, and symbol keys 6 corresponding to symbols; a space key 7; a backspace key 8; a carriage return key 9; a shift key or attribute key 10; a code key 11; a left margin set key 12; a right margin set key 13; a tab set key 14; a tab clear key 15; a tab key 16; a spelling-check key 17; a delete key 18; a cancel key 20; cursor keys 22 for moving a cursor which is provided on a display 21 (which will be described) and which designates a data input position; and an erase key 23 for providing a command to erase printed data.

Since the functions of the various function keys indicated above are well known in the art or similar to those of an ordinary typewriter, no further description of these function keys is deemed necessary.

Behind the keyboard 3, there is disposed a display 21 for displaying characters entered through the character keys 4, 5, 6, space key 7, etc.

Figure 2:
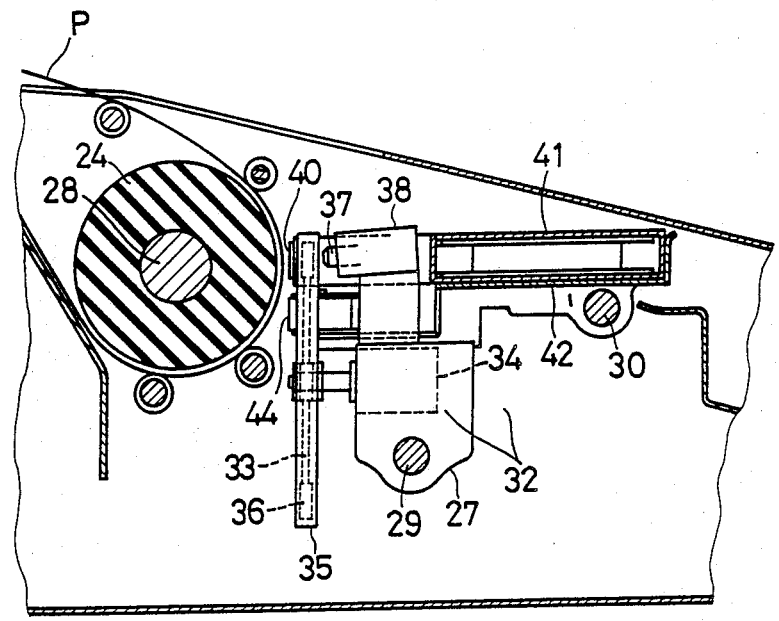
FIG. 2 is a fragmentary side elevation in cross section of the typewriter of FIG. 1, showing a printing mechanism.
Figure 4:
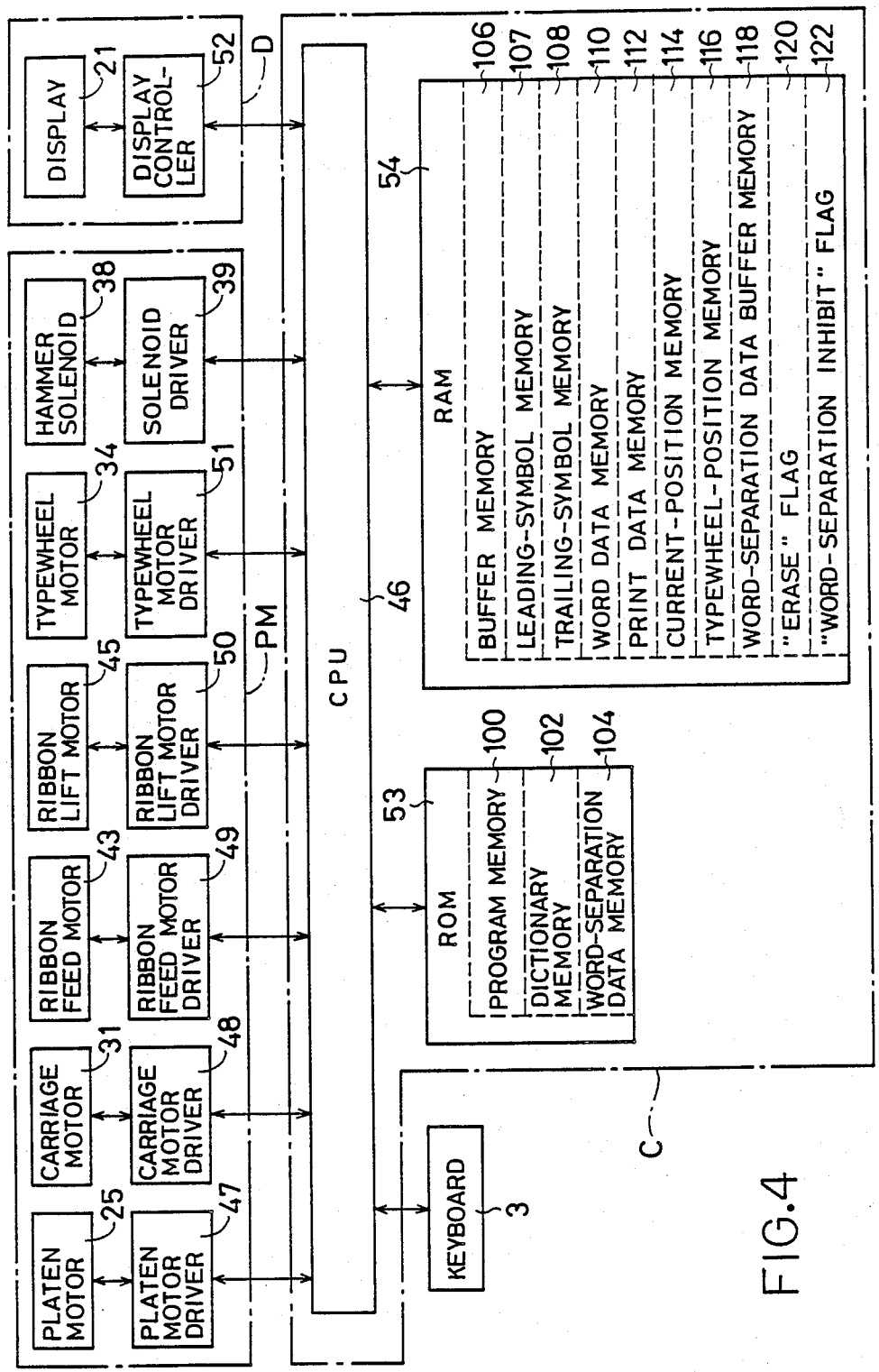
FIG. 4 is a schematic block diagram showing a control system of the typewriter.

The printing mechanism includes a platen 24 which extends laterally of the main frame 2. The platen 24 is rotated automatically by a platen motor 25 (FIG. 4) or manually by means of platen knobs 26 fixed thereto, whereby a sheet of paper P can be fed. As shown in FIG. 2, two guide rods 29, 30 are disposed parallel to a shaft 28 of the platen 24, for slidably supporting a carriage 27. The carriage 27 is reciprocated in the lateral direction of the typewriter parallel to the platen 24, by means of a wire 32 connected to a carriage motor 31 (FIG. 4).

The carriage 27 includes a typewheel motor 34 mounted thereon to drive a typewheel 33 accommodated in a typewheel cassette 35. The motor 34 has an output shaft which is removably coupled to the typewheel 33, so that a selected one of type fonts 36 formed at free ends of radial spokes of the typewheel 33 is brought into a printing position aligned with a print hammer 37, by a rotary indexing motion of the typewheel 33. The print hammer 37 is disposed atop the carriage 27, and is driven by a hammer solenoid 38 which is energized by a drive current supplied from a solenoid driver 39 (FIG. 4), so that the type font 36 placed in the printing position is struck by the hammer 37 against the sheet of paper P.

A ribbon cassette 41 accommodating a print ribbon 40 is supported on a holder 42 which is mounted on the carriage 27 such that the holder 42 is pivotally moved about its front end. The print ribbon 40 supplied from a supply spool of the ribbon cassette 41 is rewound on a take-up spool of the cassette 41, as the take-up spool is rotated by a ribbon feed motor 43 (FIG. 4). A correction ribbon 44 extends along a rear end of a rear lower portion of the holder 42, which supports a supply spool and a take-up spool for the correction ribbon 44. Namely, the supply and take-up spools for supplying and rewinding the correction ribbon 44 are disposed on the right and left sides of the ribbon cassette 41.

Figure 3:
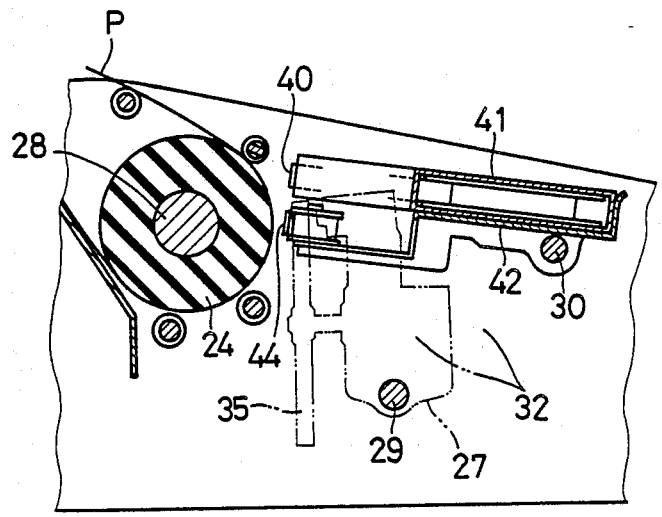
FIG. 3 is a view of the printing mechanism of FIG. 2, illustrating an operating position different from that shown in FIG. 2.

The carriage 27 also has a cam mechanism (not shown) mounted thereon, which mechanism is coupled to a drive shaft (not shown) driven by a ribbon lift motor 45, for pivotally moving the holder 42 to a selected one of three positions. That is, the holder 42 has: a printing position (as shown in FIG. 2) in which the print ribbon 40 is positioned between the selected type font 36 and the platen 24; a rest position (not shown) in which the print ribbon 40 is located downwardly away from the printing position; and an erase position (as shown in FIG. 3) in which the correction ribbon 44 is positioned between the selected type font 36 and the platen 24.

The carriage 27 and the holder 42 supports a mechanism (not shown) for feeding the correction ribbon 44 from its supply spool to its take-up spool, when the holder 42 is pivoted to its erase position indicated above.

Thus, the printing mechanism comprises the platen 24, the platen drive device (including the platen motor 25), the carriage 27, the carriage drive device (including the carriage motor 31), the typewheel 33, the typewheel drive device (including the typewheel motor 34), the print ribbon 40, the print ribbon feeding device (including the ribbon feed motor 43), the cam mechanism for pivotally moving the print ribbon 40, the drive device (including the ribbon lift motor 45) for operating the cam mechanism, the print hammer 37, and the hammer drive device (including the hammer solenoid 38). The individual drive devices of the printing mechanism are connected to a central processing unit (CPU) 46 of a control device C.

Referring next to the block diagram of FIG. 4, a control system for the typewriter 1 will be described.

The control system includes drive means PM for the printing mechanism, which includes the platen motor 25, a driver 47 for the motor 25, the carriage motor 31, a driver 48 for the motor 31, the ribbon feed motor 43, a driver 49 for the motor 43, the ribbon lift motor 45, a driver 51 for the motor 45, the typewheel motor 34, a driver 50 for the motor 34, the hammer solenoid 38, and a driver 39 for the solenoid 38.

The typewriter 1 has a display device D which includes the display 21 in the form of a liquid crystal display, and a display controller 52. The display controller 52 stores a batch of display data corresponding to coded character data of the individual characters to be displayed on the display 21. The display controller 52 supplies the display 21 with the display data corresponding to the coded character data received from the CPU 46.

The control device C consists of the CPU 46, and a ROM (read-only memory) 53 and a RAM (random-access memory) 54 which are connected to the CPU 46. To the CPU 46 are connected the keyboard 3, the drivers 39 and 47-51 of the drive means PM, and the display controller 52.

Figure 5A:
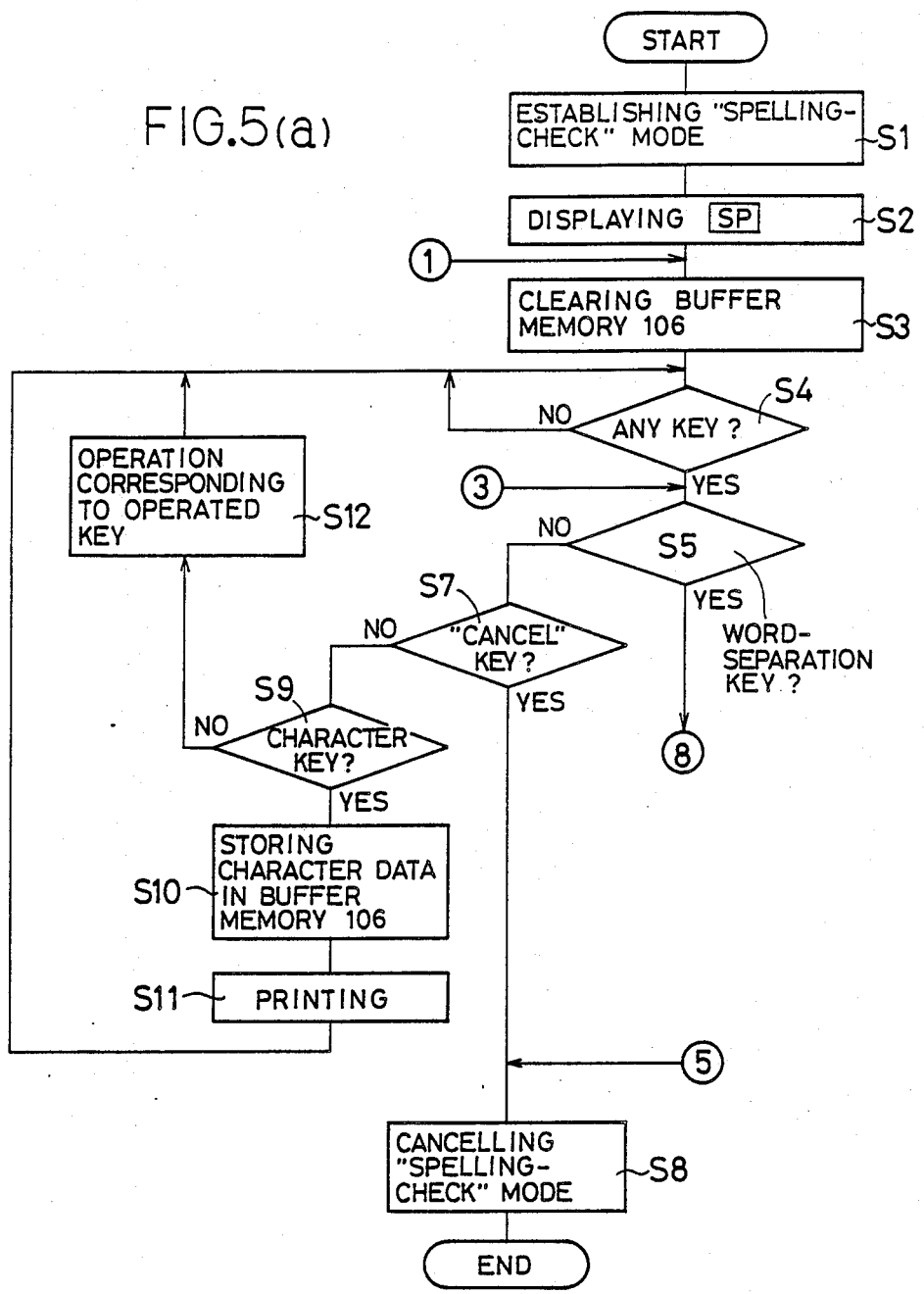
Figure 5C:
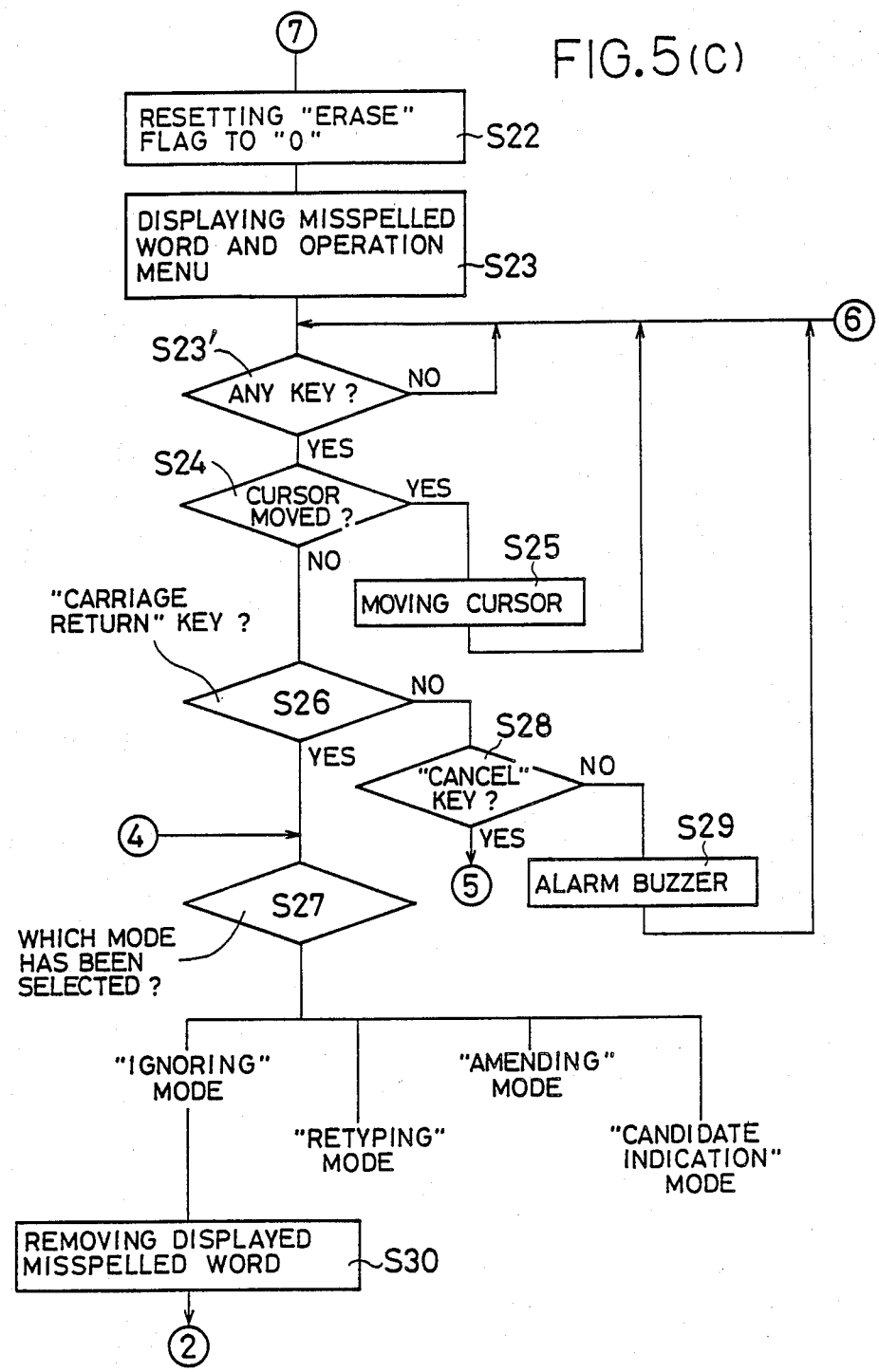
Figure 6:
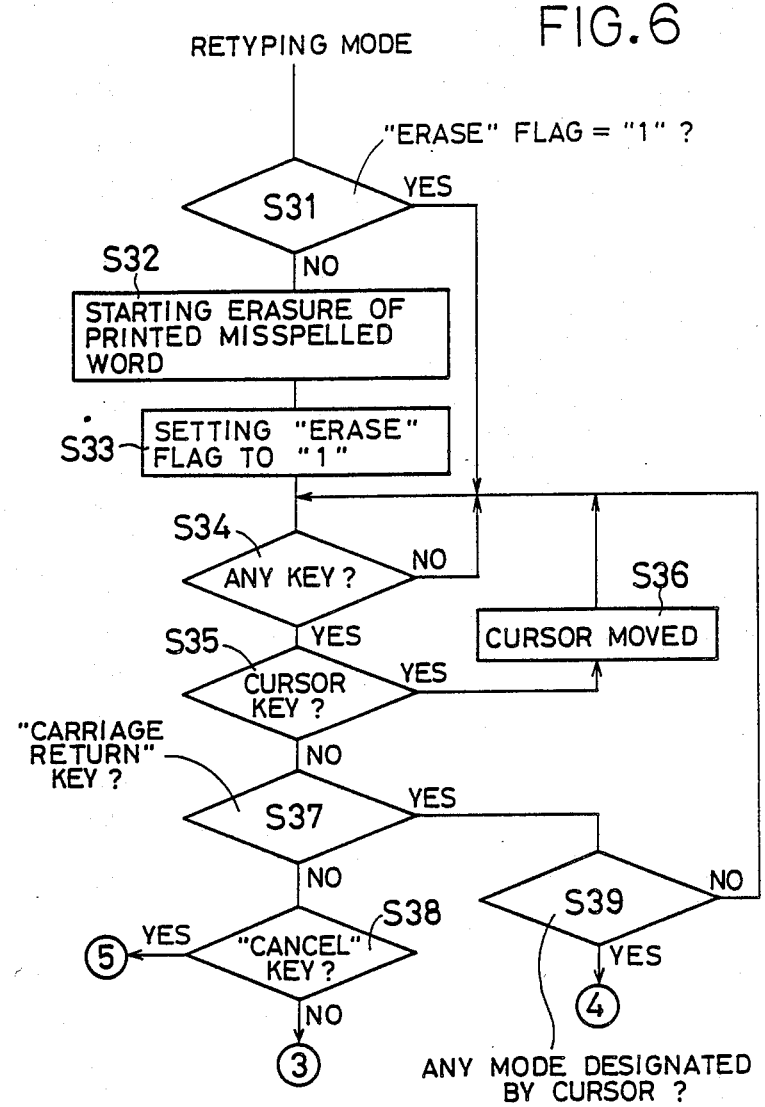
Figure 7:
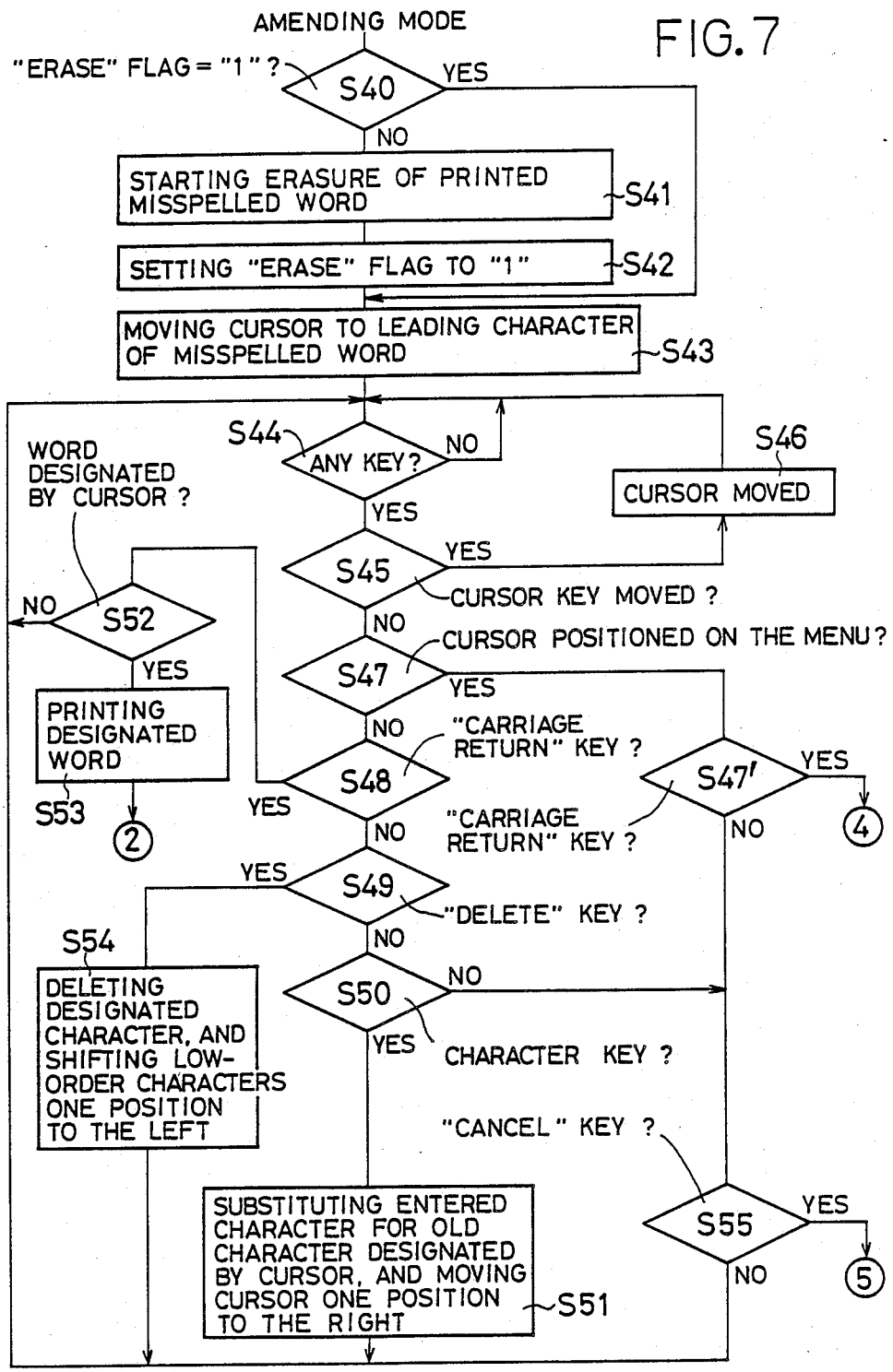
Figure 8:
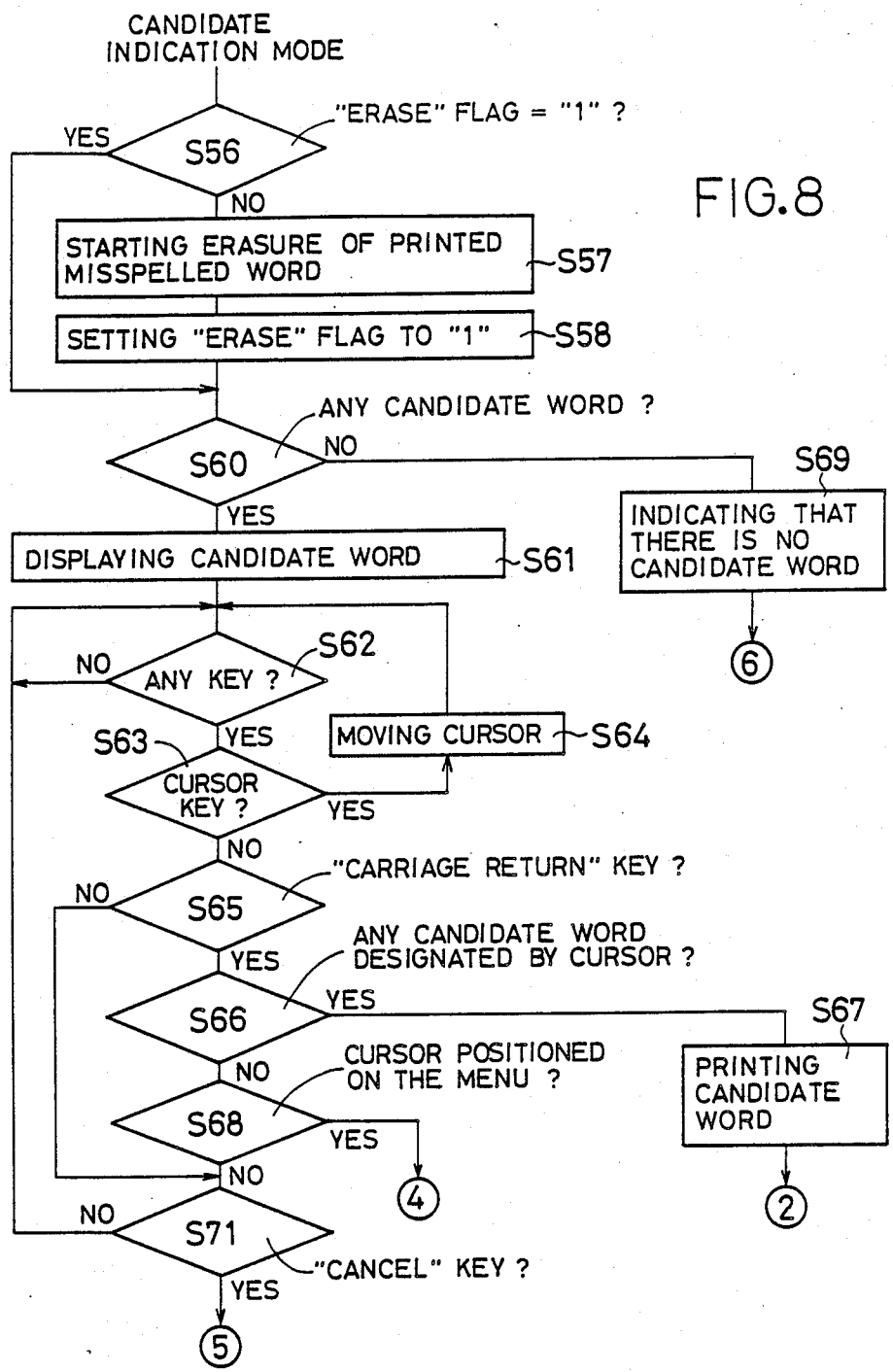

The ROM 53 includes a program memory 100, a dictionary memory 102, and a word-separation data memory 104. The program memory 100 stores: a control program for controlling the drive motors 25, 31, 34, 43 and 45, the hammer solenoid 38, and the display 21, in response to the character data corresponding to characters and spaces entered through the character keys 4, 5, 6 and space key 7; a control program for controlling the drive motors 25, 31, 34, 43 and 45 and the hammer solenoid 38, in response to the code data corresponding to the various function keys provided on the keyboard 3; a control program for effecting spelling-check and data erasing operations as shown in FIGS. 5(a)-5(c); and a control program for retyping, amending and correcting misspelled words as shown in FIGS. 6, 7 and 8. The dictionary memory 102 stores, for example, about 70000 words or entries arranged in the alphabetical order as in an ordinary dictionary, for checking the entered words for correctness of their spellings. However, every set of data stored in the dictionary memory 102 need not be word data indicative of a word. The word-separation data memory 104 stores word-separation data indicative of termination of a word, such as a space, a carriage return, a tab setting, a period, a semicolon and a comma, which functions to separate adjacent chains of characters from each other.

The RAM 54 includes: a buffer memory 106 for storing entered word data, i.e., coded character data (letter data, numeral data and symbol data) representative of a chain of characters which has been entered and which is supposed to constitute a word whose spelling is checked as described below; a leading-symbol memory 107 for storing symbol data and/or numeral data indicative of a symbol or symbols and/or a numeral or numerals, which symbol and/or numeral data precedes letter data (indicative of a group of successive alphabetic letters) of the character data stored in the buffer memory 106; a trailing-symbol memory 108 for storing symbol data and/or numeral data indicative of a symbol or symbols and/or a numeral or numerals, which symbol and/or numeral data follows the letter data of the coded character data stored in the buffer memory 106; and a word data memory 110 for storing the letter data indicative of a group of alphabetic letters which is supposed to constitute a word. Described more specifically, words are often preceded and/or followed by at least one symbol and/or numeral. The following are some examples of such words: "America"; [Chapter]; Happy?; and shaft10. In these cases, the coded character data entered through the keyboard is stored in the buffer memory 106, but the symbol or numeral data indicative of the leading symbol or numeral " or [ is stored in the leading-symbol memory 107, and the letter data indicative of the words "America", "Chapter", "Happy" and "shaft" is stored in the word data memory 110. Further, the symbol or numeral data indicative of the trailing symbol or numerals ", ], ? or 10 is stored in the trailing-symbol memory 108.

The RAM 54 further includes: a print data memory 112 for storing coded character data as the individual characters represented by the character data are successively printed; a current-position memory 114 for storing data indicative of a current position of the carriage 27, i.e., a position at which the carriage 27 is currently located for a printing operation; a typewheel-position memory 116 for storing data indicative of a current angular position of the typewheel 33, i.e., the identification number of the type font 36 which is currently placed in the printing position; a word-separation data buffer memory 118 for temporarily storing word-separation data indicative of a space, a carriage return, a period, a semicolon, a comma, etc., which is entered through the respective word-separation keys 6, 7, 9, 16; an ERASE flag 120 (which will be described); and various memories for temporarily storing data obtained as a result of arithmetic operations by the CPU 46.

As character data is entered through the character keys 4, 5, 6 on the keyboard 3, the CPU 46 processes the received character data to control the drive means PM to activate the printing mechanism, for printing the corresponding characters, i.e., alphabetic letters, numerals and symbols, on the sheet of pater P. In the meantime, the CPU 46 stores the received character data in the buffer memory 106. Each time the CPU 46 receives word-separation data, the CPU 46 operates to perform a spelling-check function for each of the entered words separated from each other by the word-separation data, according to the spelling-check control program as shown in the flow chart of FIGS. 5(a), 5(b)

and 5(c), and based on the word data stored in the dictionary memory 102.

As the characters are printed, the CPU 46 stores the printed character data in the print data memory 112 of the RAM 54, such that the stored character data corresponds to the printing positions. Further, the CPU 46 updates the data in the current-position memory 114 and the data in the typewheel-position memory 116, as the carriage 27 and the typewheel 33 are moved by the respective drive motors 31, 34.

As the code data corresponding to the various function keys on the keyboard 3 is entered, the CPU 46 processes the received code data, according to the appropriate control program retrieved from the program memory 100 of the ROM 53, and applies control signals corresponding to the received code data, to the individual drivers 39, 47–51 and the display controller 52.

Further, the CPU 46 processes the character data received from the character keys 4, 5, 6 and the space key 7 on the keyboard 3, or the character data retrieved from the print data memory 112, according to the appropriate control program retrieved from the program memory 100 of the ROM 53. As a result, control signals corresponding to the received character data are applied to the drivers 39, 47–51 of the drive means PM and to the display controller 52, in order to activate the printing mechanism and the display 21.

Described more specifically, when character data indicative of a character is received, the drive means PM is operated as follows. Initially, a control signal is applied from the CPU 46 to the typewheel motor driver 51, which in turn applies a drive current to the typewheel motor 34, whereby the typewheel 33 is rotated by the motor 34, by a suitable angle to bring the type font 36 corresponding to the entered character data into the printing position in front of the print hammer 37. Simultaneously, the CPU 46 applies a control signal to the ribbon lift motor driver 50, which in turn applies a drive current to the ribbon lift motor 45, whereby the cam mechanism coupled to the drive shaft of the motor 45 is operated to move the holder 42 and the print ribbon 40 to the printing position of FIG. 2.

Subsequently, the CPU 46 applies a control signal to the solenoid driver 39, which then applies a drive current to the hammer solenoid 38, whereby the print hammer 37 is activated to impact the selected type font 36 against the sheet of paper P via the print ribbon 40. Thus, the character corresponding to the type font 36 is printed on the paper P.

If a predetermined length of time has passed without the CPU 46 receiving character data from any character keys, a control signal is applied to the ribbon lift motor driver 50, to operate the ribbon lift motor 45 for restoring the holder 42 and the print ribbon 40 to the rest position.

In the meantime, the CPU 46 applies control signals to the carriage motor driver 48 and the ribbon feed motor driver 49. Consequently, the motor driver 48 applies a drive current to the carriage motor 31, to operate the motor 31 by an angle necessary to feed the carriage 27 by a one-character distance in the printing direction, via the wire 32. At the same time, the motor driver 49 applies a drive current to the ribbon feed motor 43 to operate the feed motor 43 by a suitable angle, for feeding the print ribbon 40.

When the carriage return key 9 on the keyboard 3 is operated, the CPU 46 processes the received carriage return data according to the appropriate control program retrieved from the program memory 100 of the ROM 53, and applies control signals to the carriage motor driver 48 and the platen motor driver 47. As a result, the motor driver 48 applies a drive current to the carriage motor 31 to operate the carriage motor 31 in the reverse direction, until the carriage 27 is returned to the print start position, i.e., a first column of a print line. Simultaneously, the motor driver 47 applies a control current to the platen motor 25, to operate the motor 25 by an angle necessary to feed the sheet of paper P by a selected line-to-line spacing, i.e., to the next line of characters.

When the erase key 23 is operated to erase a printed character on the paper P, the CPU 46 retrieves from the program memory 100 of the ROM 53 a control program for erasing operation, and applies a control signal to the ribbon lift motor driver 50. Consequently, the ribbon lift motor 45 is operated to pivot the holder 42 to the erasing position of FIG. 3. Then, the CPU 46 retrieves from the print data memory 112 the character data corresponding to the printed character to be erased, based on the current-position data stored in the current-position memory 114 of the RAM 54. Based on the retrieved character data, the CPU 46 applies a control signal to the typewheel motor driver 51 to activate the typewheel motor 34, for rotating the typewheel 33 to bring the type font 36 corresponding to the character to be erased, to the printing position. Then, a control signal is applied to the solenoid driver 39 to activate the hammer solenoid 38, whereby the selected type font 36 is impacted against the paper P via the correction ribbon 44, and the printed character is thus erased.

In the above case, the character data corresponding to the erased character is erased from the buffer memory 106, if the erasure occurs while that character data is stored in the buffer memory 106.

In the present typewriter 1, the operator is informed of a misspelled word which is detected in the spelling-check routine. Then, the operator is prompted to select a desired one of four operation modes for dealing with the detected misspelled word. These four modes are: ignoring mode; retyping mode; amending mode and candidate indication mode, which will be described. The ignoring mode is selected when it is desired to ignore the detection of misspelling of the entered word, since the entered word has not in fact misspelled, for example, in the case where the entered word is a proper noun or name. In this mode, a data entry operation may be continued. When the retyping mode is selected, the misspelled word is erased, and then the operator is permitted to key in a correct or other word. The amending mode is selected in the case where the misspelled word can be corrected by changing and/or deleting a part of the misspelled word, and/or adding a character or characters. The candidate indication mode is selected if the operator desires that the typewriter presents a candidate word or words which are substituted for the misspelled word. In this case, the operator selects one of the presented candidate words, and the selected candidate is printed.

The operation of the instant typewriter 1 will be described in detail, beginning with the spelling-check function to detect misspelling of an entered word, referring to FIGS. 5(a), 5(b) and 5(c).

When the spelling-check key 17 is operated, the CPU 46 executes step S1 to establish a spelling-check mode, and step S2 in which [SP] indicating the spelling-check mode appears on the display 21. Step S2 is followed by step S3 in which the buffer memory 106 is cleared. Then, step S4 to check if any key has been operated is repeated, until any key has been operated.

Upon operation of any key on the keyboard 3, the CPU 46 goes to step S5 to check whether or not the operated key is a word-separation key such as the space key 7, carriage return key 9, tab key 16, symbol key 6 corresponding to a comma or a period, etc. If the operated key is one of the word-separation keys 6, 7, 9, 16, step S5 is followed by step S6. If not, step S5 is followed by step S7 to check if the operated key is the cancel key 20, or not. If so, step S7 is followed by step S8 to cancel the spelling-check mode, and the instant control program is ended. Namely, the spelling-check mode is established by the spelling-check key 17, and cancelled by the cancel key 20.

If a negative decision is made in step S7, step S7 is followed by step S9 to check if the operated key is any one of the character keys 4, 5, 6. If so, the CPU 46 goes to step S10 in which coded character data corresponding to the operated character key is stored in the buffer memory 106. Then, step S11 is executed to print the character represented by the stored character data. Step S11 is followed by step S4, and this step S4 is repeatedly executed until any key has been operated. If a negative decision is made in step S9, then the CPU 46 executes step S12 to perform an operation corresponding to the operated key, and then returns to step S4.

When one of the word-separation keys 6, 7, 9, 16 is operated after the character data indicative of a given number of successive characters has been stored in the buffer memory 106, an affirmative decision is made in step S5, and the CPU 46 goes to step S6 to check if the buffer memory 106 stores character data or not. If a negative decision is obtained in step S6, the CPU 46 goes to step S20, skipping steps S13–S19. In step S20, an operation defined by the operated word-separation key is implemented. In the present example wherein the buffer memory 106 stores the character data indicative of successive characters, an affirmative decision is obtained in step S6, and the CPU 46 goes to step S13 to determine whether or not the leading character of the successive characters stored in the buffer memory 106 is an alphabetic letter. If the leading character is not an alphabetic letter, step S13 is followed by step S14 in which numeral and/or symbol data which usually precedes successive sets of letter data (e.g., indicative of a word) is stored in the leading-symbol memory 107. If two or more sets of numeral and/or symbol data precede the successive sets of letter data, all of these sets of numeral and/or symbol data are stored in the leading-symbol memory 107. Step S14 is followed by step S15 to determine whether or not the trailing character of the successive characters stored in the buffer memory 106 is an alphabetic letter. If so, step S15 is followed by step S17. If the trailing character is not an alphabetic letter, then the CPU 46 goes to step S16 to store in the trailing-symbol memory 108 numeral and/or symbol data which usually follows successive sets of letter data. In step S17, only the successive sets of letter data indicative of successive alphabetic letters (if any) are stored in the word data memory 110. Step S17 is followed by step S18 to check if the word data memory 110 stores letter data or not. If the word data memory 110 stores letter data, then step S19 is executed to determine whether the spelling of a word represented by the stored letter data is correct, or not. More specifically, the spelling-check operation in step S19 is effected by checking if the dictionary memory 102 stores word data which is identical with the successive sets of letter data, i.e., word data stored in the word data memory 110 If the dictionary memory 102 stores the word data indicative of the successive characters represented by the letter data stored in the word memory 110, then the CPU 46 executes step S20 in which an operation defined by the word-separation key 6, 7, 9, 16 is implemented. For instance, if the operated word-separation key is the space key 7, the carriage 27 is fed to the right by one character distance, without any printing action. If the operated word-separation key is the carriage return key 9, the carriage 27 is returned to the print start position while the paper P is advanced to the next line.

If no letter data is stored in the word data memory 110 (step S18) or if the dictionary memory 102 does not store the word data identical with the letter data stored in the word data memory 110 (step S19), the CPU 46 determines that the successive letters represented by the letter data stored in the word data memory 110 do not constitute a correct word, namely, the word stored in the word data memory 110 is a misspelled word. In this case, step S18 or S19 is followed by step S21 in which an alarm buzzer is activated, in order to inform the operator of this fact. Subsequently, the CPU 46 goes to step S22 to clear the ERASE flag 120, and step S23 in which the display 21 displays the entered character data stored in the buffer memory 106, that is, not only the misspelled word (successive alphabetic letters) but also the leading and/or trailing numeral(s) and/or symbol(s) (which precede and/or follow the misspelled word). This aspect will be described in detail. At the same time, the display 21 provides a menu consisting of the previously indicated four modes of operations (ignoring, retyping, amending and candidate indication modes), prompting the operator to select a desired one of these modes to deal with the misspelled word displayed.

When the operator operates the cursor key or keys 22 to move the cursor on the display 21, for selecting one of the operation modes indicated on the display 21, affirmative decisions are obtained in steps S23' and S24, whereby the cursor is moved, in step S25, to designate the ignoring, retyping, amending or candidate indication mode. If the operator operates the carriage return key 9 after the desired mode is selected, an affirmative decision is made in step S26, and step S27 is executed to detect the selected mode. Subsequently, the selected mode of operation will be performed as described below. If the cancel key 20 is operated after a misspelled word is displayed, an affirmative decision is obtained in step S28, and the spelling-check mode is cancelled in step S8. If a key other than the cursor keys 22, carriage return key 9 and cancel key 20 is operated after the misspelled word is displayed, step S28 is followed by step S29 in which the alarm buzzer is activated, informing the operator that the control cannot perform an operation corresponding to the operated key.

The above-indicated four modes of operations will be described.

If the ignoring mode is selected, this means that the operator wishes to continue a data input operation, without erasing the entered word which has been judged to be a misspelled word. Accordingly, the indication of the allegedly misspelled word is removed from the display 21 in step S30, and then the control goes to step S20 in which the operation corresponding to the operated word-separation key 6, 7, 9, 16 is implemented as in an ordinary operation wherein successive words are correctly entered and printed.

If the retyping mode is selected, a retyping routine as shown in the flow chart of FIG. 6 will be executed.

Initially, the CPU 46 executes step S31 to check if the ERASE flag 120 is set at "1". Since this flag 120 is not set in the initial state, step S31 is followed by step S32 in which the letters of the misspelled word printed on the paper P are sequentially erased. At the same time, the character data stored in the buffer memory 106 is erased. If the character data in the buffer memory 106 includes numeral and/or symbol data, the numeral and-/or symbol data are also erased. Then, the CPU 46 goes to step S33 in which the ERASE flag 120 is set to "1", and to step S34 which is repeatedly executed until any key has been operated. If the operator operates the cursor key or keys 22, an affirmative decision is obtained in step S35, and the cursor on the display 21 is moved in step S36. If a character key 4, 5, 6 is operated after the cursor is moved to a desired position, an affirmative decision is obtained in step S34, but a negative decision is obtained in steps S35, S37 and S38, whereby the control goes to step S5 shown in FIG. 5(a). Therefore, the character corresponding to the operated character key is printed.

If the operator desires to select another mode of operation after the retyping mode has been once selected, the operator moves the cursor on the display 21, to designate the desired mode, by operating the cursor key or keys 22, and then operates the carriage return key 9. As a result, an affirmative decision is made in step S37, and the following step S39 is executed to check if the cursor is placed in the position designating any one of the four modes. If a negative decision is made in step S39, the control goes to step S34. If an affirmative decision is made, step S39 is followed by step S27 shown in FIG. 5(c), whereby the operator is permitted again to select any desired one of the four modes.

Even after the retyping mode has been established, the spelling-check mode can be cancelled by operating the cancel key 20, since step S38 is followed by step S8 shown in FIG. 5(a). If the retyping mode is established, the ERASE flag 120 is set to "1" in step S33. It is possible that the operator desires to re-establish the retyping mode after the once established retyping mode is changed to another mode. In this case, the ERASE flag 120 is set to "1" when the retyping mode is initially established, and therefore an affirmative decision is obtained in step S31 when the retyping mode is again established. Consequently, steps S32 and S33 following step S31 are skipped. Namely, an erasing operation to erase the printed misspelled word will not occur when the retyping mode is re-established.

If the operator judges, from observing the misspelled word indicated on the display 21, that the misspelled word can be corrected by changing and/or deleting a character of characters of the misspelled word, and/or by adding a character or characters to the misspelled word, the operator selects the amending mode. In this case, an amending routine shown in the flow chart of FIG. 7 will be implemented.

Initially, the CPU 46 executes step S40 to check if the ERASE flag 120 is set at "1". Since this ERASE flag 120 is initially set at "0", step S40 is followed by step S41 in which the misspelled word is erased, and step S41 is followed by step S42 in which the ERASE flag 120 is set to "1". Subsequently, the CPU 46 goes to step S43 in which the cursor on the display 21 is moved to the first character of the displayed misspelled word. Step S43 is followed by step S44 which is repeatedly executed until any key is operated. If the operator operates the cursor key 22 or keys 22 in this condition, an affirmative decision is obtained in steps S44 and S45, and the cursor is moved in step S46. In other words, the cursor is automatically moved to the first character of the misspelled word when the amending mode is established, and then the operator is allowed to move the cursor to the desired character of the misspelled word displayed on the display 21, by operating the cursor key or keys 22.

If the operator operates an appropriate one of the character keys (letter keys 4), a negative decision is obtained in steps S45, S47, S48 and S49 while an affirmative decision is obtained in step S50. As a result, step S50 is followed by step S51 wherein the character designated by the cursor on the display 21 is replaced by the character entered by the operated character key, and the cursor is moved one position to the right. Then, the control returns to step S44.

The misspelled word displayed on the display 21 may be corrected by repeating the operation mentioned above. When the carriage return key 9 is subsequently operated, the decision in step S48 becomes affirmative, and step S52 is executed to check if the cursor on the display 21 designates the displayed word, i.e., if the cursor is placed in one of the character positions of the displayed word. If so, step S52 is followed by step S53 in which the word designated by the cursor is printed. Then, the control goes to step S20 shown in FIG. 5(b). If the cursor does not designate the corrected word, then step S52 is followed by step S44.

If the operator desires to delete or erase one of the characters of the displayed misspelled word, the delete key 18 is used. With the delete key 18 operated, a negative decision is made in steps S45, S47 and S48, while an affirmative decision is made in step S49, whereby step S54 is executed to delete the character designated by the cursor, and shift the low-order characters one position to the left. Then, the control returns to step S44.

If the operator wishes to change the once selected amending mode to another mode, the desired mode may be selected by first operating the cursor key 22 to position the cursor on the menu provided on the display 21, and then operating the carriage return key 9. In this instance, an affirmative decision is obtained in steps S47 and S47', and consequently the control goes to step S27. Thus, the operator is permitted to re-select any desired one of the four operating modes.

If the cancel key 20 is operated while the cursor is positioned on the menu, an affirmative decision is made in step S47, and a negative decision is made in step S47', whereby step S47' is followed by step S55 in which an affirmative decision in obtained. Consequently, the control goes to step S8 shown in FIG. 5(a), and the spelling-check mode is cancelled. This cancellation can be effected by the cancel key 20, even while the cursor is placed at any character position of the displayed misspelled word. In this case, an affirmative decision is made in step S44, and a negative decision is made in steps S45, S47, S48, S49 and S50. Therefore, step S50 is followed by step S55 in which an affirmative decision is obtained, and consequently step S8 is executed to cancel the spelling-check mode.

A candidate indication routine shown in FIG. 8 will be implemented if the operator selects the candidate indication mode, to ask the typewriter to provide a correct word or words which may be substituted for the misspelled word.

In this candidate indication routine, steps S56–S58 are initially executed to erase the printed misspelled word and perform other operations, as in the retyping and amending modes. Then, step S60 is executed to check if any candidate word or words to be substituted for the misspelled word are available or not. That is, the CPU 46 determines in step S60 whether or not the dictionary memory 102 stores at least one word whose spelling is close to that of the misspelled word. If an affirmative decision is obtained in step S60, the CPU 46 goes to step S61 in which a candidate word or words are indicated on the display 21. Then, step S62 is repeated until any key is operated. As illustrated in FIG. 9, the candidate words are displayed together with a numeral or numerals and/or a symbol or symbols, which precede or follow the candidate word, if the corresponding misspelled word is preceded or followed by the numeral(s) and/or symbol(s). Namely, each candidate word retrieved from the dictionary memory 102 is displayed together with the at least one leading numeral and/or symbol retrieved from the leading-symbol memory 107, and the at least one trailing numeral and/or symbol retrieved from the trailing-symbol memory 108. Although the numeral and/or symbol data preceding and/or following the misspelled word data is erased when the misspelled word data is erased, as previously described, the numeral and/or symbol data is displayed together with a candidate word or words which replace the misspelled word. It is noted that the display 21 also provides the menu (four operating modes) as well as the misspelled word and the corresponding candidate word o words, as indicated in FIG. 9.

If the operator operates the cursor key 22 in this condition, an affirmative decision is obtained in step S63, and step S64 is executed to move the cursor on the display 21. Thus, the cursor may be positioned at the desired candidate word displayed. When the operator then operates the carriage return key 9, an affirmative decision is obtained in step S65, and step S65 is followed by step S66 to check if any candidate word is designated by the cursor. Since the decision in step S66 is affirmative, the designated candidate word is printed in step S67. If the candidate word displayed is preceded or followed by a numeral or numerals and/or a symbol or symbols, these characters are also printed.

In the case where a desired word is not included in the candidate word or words indicated on the display 21, or the operator wishes to change the selected candidate indication mode to another mode, the cursor is first positioned on the menu, and the carriage return key 9 is operated. In this case, a negative decision is made in step S66, while an affirmative decision is made in step S68. Consequently, the control goes to step S27 shown in FIG. 5(c), in which the operator is permitted to reselect desired one of the operating modes. It is noted that the indication on the display 21 as illustrated in FIG. 9 remains even after a new operating mode is selected. In this condition, it is possible to select the amending mode, for example, for amending one of the candidate words indicated on the display 21. More specifically, the desired candidate word can be selected by moving the cursor to the position of that word, and the selected word can be amended by positioning the cursor to the desired character position at which the character is deleted or changed to another or a new character is inserted.

If a negative decision is obtained in step S60, that is, if the dictionary memory 102 does not store a candidate word whose spelling is close to that of the misspelled word, step S60 is followed by step S69 to provide an indication "Not Found" on the display 21, as shown in FIG. 10, informing the operator that no candidate word is present. Then, the control goes to step S23' shown in FIG. 5(c). This step S23' is repeatedly executed until any key is operated. When any key is operated in this condition, the control goes to step S24 and the subsequent steps, permitting the operator to re-select a desired one of the operating modes. Therefore, if a desired candidate word is not presented on the display 21, it is possible to select the retyping mode and enter a correct word, or select the amending mode for correcting the misspelled word on the display 21 and printing the corrected word. Even after the retyping or amending mode is selected, the indication as shown in FIG. 10 remains on the display 21.

In the case where the cancel key 20 is operated after the cadidate indication mode is established, a negative decision is obtained in steps S63, S65, S66 and S68, and an affirmative decision is obtained in step S71, whereby the control goes to step S8 shown in FIG. 5(a) to cancel the spelling-check mode.

As described above, the present typewriter 1 is characterized by its capability of enabling the operator to select one of a plurality of operating modes to deal with a misspelled word detected in the spelling-check mode. Another feature of the present typewriter 1 lies in that a detected misspelled word is displayed together with a numeral or numerals and/or a symbol or symbols, which precede and/or follow the misspelled word. A further feature of the present arrangement is that an operation corresponding to the word-separation key 6, 7, 9, 16 is inhibited if the spelling-check operation finds a misspelled word. These features of the present typewriter 1 will be described in detail.

First, the indication of a misspelled word together with preceding and/or following numeral(s) and/or symbol(s) will be described.

As described above, when entered data includes numeral and/or symbol data preceding and/or following successive sets of letter data (which usually constitute a word), the spelling-check operation of the entered data is effected by discarding such numeral and/or symbol data, i.e., only the letter data indicative of alphabetic letters is checked for correctness of the spelling of the word represented by the letter data. When the entered letter data is found to represent a misspelled word, it is preferred that the misspelled word be displayed together with preceding and/or following numeral and/or symbol data if any. If only the misspelled word is displayed as in a conventional typewriter, the operator is not sure whether the preceding and/or following numerals and/or symbols are printed on the paper, as well as a selected candidate word to be substituted for the misspelled word. Therefore, the operator feels uneasy in this respect.

In the present embodiment, however, the misspelled word is displayed together with accompanying numeral(s) and/or symbol(s), as indicated at S23 in the flow chart of FIG. 5(c). Namely, the spelling-check operation is accomplished based on the letter data stored in the word data memory 110, while the indication on the display 21 in step S23 is effected based on the chararacter data stored in the leading-symbol memory 107, the letter data stored in the word data memory 110, and the character data stored in the trailing-symbol memory 108. Similarly, the numeral(s) and/or symbol(s) stored in the leading-symbol and trailing-symbol memories 107, 108 are printed as well as a selected candidate word, in step S67 of FIG. 8. Thus, the operator feels easy, since the candidate word and the accompanying numeral and/or symbol (if any) are printed as indicated on the display 21.

There will be described next the inhibition of an operation corresponding to the word-separation key.

In the present embodiment, the spelling-check operation is initiated in response to the operation of one of the word-separation keys 6, 7, 9, 16, as previously discussed. However, if the operation defined by the word-separation data entered through the operated word-separation key is performed as soon as the spelling-check operation has been initiated, the performed operation tends to be in vain. For instance, if an entered word terminated by word-separation data such as a comma or period is detected as a misspelled word due to lack of a character or characters or addition of an unnecessary character or characters, the comma or period if printed according to the operation of the comma or period key 6 must be erased, because the number of characters of a correct word that should replace the misspelled word is different from the number of characters of the misspelled word, and the position of the comma or period following the correct word must be shifted from the printed comma or period. Also, if the operated word-separation key is the space key 7 or carriage return key 9, the carriage 17 must be returned to the misspelled word for deleting or correcting that word. This means that the spacing movement (escapement) or carriage return corresponding to the key 9, 17 is effected in vain, prior to the correction of the misspelled word.

In the present typewriter 1, while the spelling-check operation is initiated upon operation of the word-separation key, the operation corresponding to the operated word-separation key is inhibited if the entered data is found misspelled, as is understood from the foregoing explanation. The operation in step S20 of FIG. 5(b) corresponding to the operated word-separation key is initiated only after the spelling-check of the entered data reveals the correctness of the spelling, or after the misspelled word is erased and replaced by a newly printed correct word. Thus, the instant arrangement prevents the word-separation data from being executed in vain.

In the present embodiment, an operation corresponding to the operated word-separation key 6, 7, 9, 16 which terminates a detected misspelled word is performed in step S20 immediately after the ignoring mode is selected. However, it is possible to effect the operation of step S20 only after the word-separation key which terminates the detected misspelled word is again operated. For instance, a spacing movement of the carriage 27 corresponding to the operated space key 7 which terminated a proper name detected as a misspelled word, is effected when the space key 7 is again operated. This aspect of the present invention will be described in greater detail, in connection with a modified embodiment, referring to the flow chart of FIG. 11.

In this modified embodiment, the RAM 54 of the control device C has a WORD-SEPARATION INHIBIT flag 122 in place of the ERASE flag 120, as indicated in two-dot chain line in FIG. 4.

Figure 11:
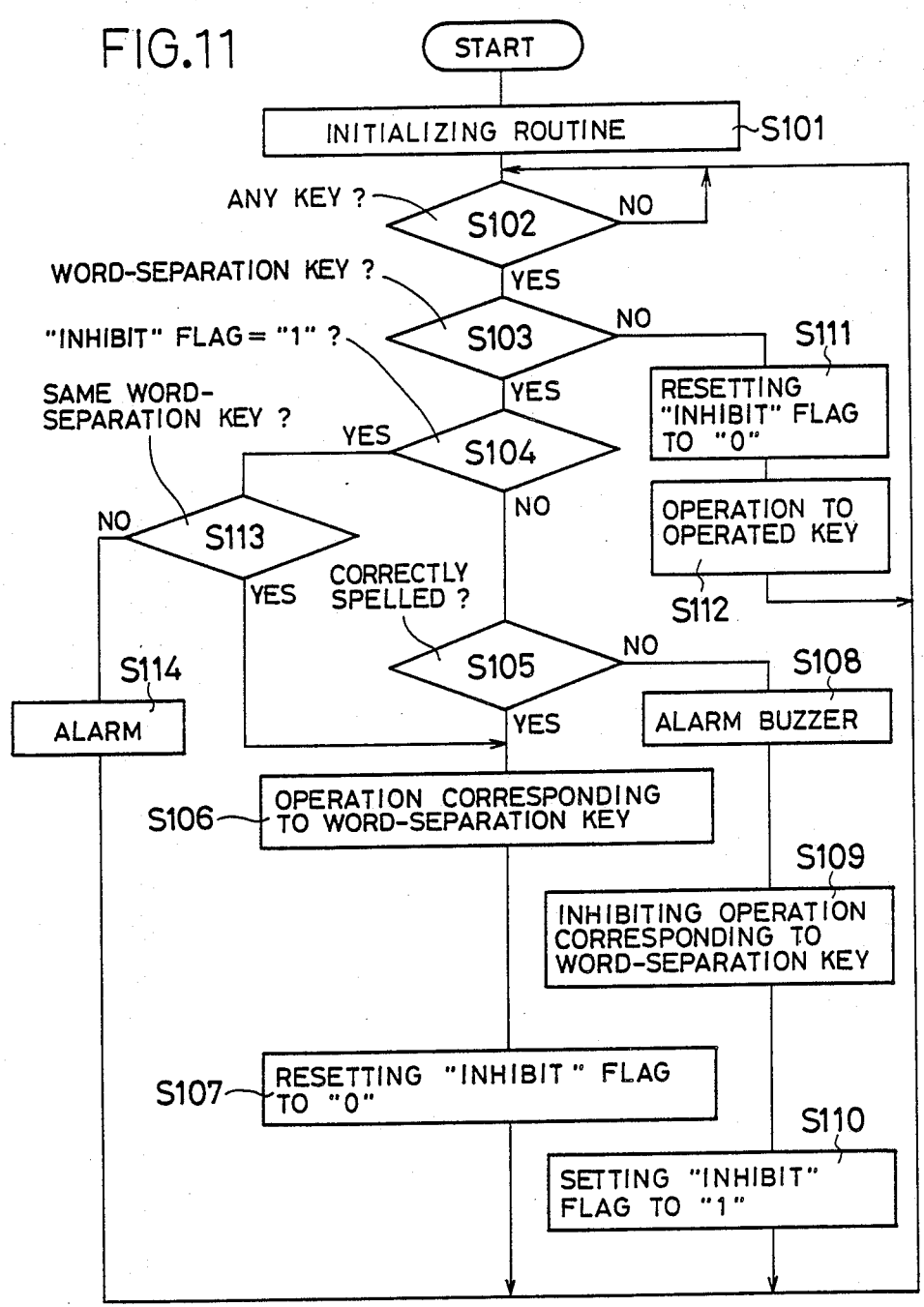
FIG. 11 is a flow chart showing an operation of another embodiment of the typewriter of the present invention.

Referring to FIG. 11, there is shown an operation according to the modified embodiment. Upon application of power to the typewriter 1, the control goes to step S101 to execute an initializing routine which includes the resetting of the WORD-SEPARATION INHIBIT flag 122 to "0". Step S101 is followed by step S102.

In step S102, the CPU 46 checks if any key has been operated. This step is repeatedly executed at a predetermined time interval, until any key is operated. When any key is operated, the control goes to step S103 to check if the operated key is any one of the word-separation keys such as the space key 7, carriage return key 9, or the symbol keys 6 corresponding to a period, semicolon, comma, etc. If the operated key is any one of the word-separation keys, the corresponding word-separation data is stored in the word-separation data buffer memory 118. Then, the control goes to step S104. If not, the control goes to step S111.

In step S104, the CPU 46 checks if the WORD-SEPARATION INHIBIT flag 122 is set at "1" or not, i.e., if the operation defined by the word-separation data stored in the buffer memory 118 has once been inhibited for the word currently stored in the word data memory 110. If the flag 122 is set at "1", step S104 is followed by step S113. If the flag 122 is set at "0", step S104 is followed by step S105.

In step S105, the spelling-check operation for the entered word stored in the word data memory 100 is achieved according to the spelling-check control program stored in the program memory 100, by checking if the dictionary memory 102 stores a word identical with the entered word. Thus, the spelling of the entered word is checked for correctness. If the spelling of the entered word is correct, step S105 is followed by step S106. If the entered word is found to be misspelled, the control goes to step S108.

In step S106, an operation defined by the word-separation data stored in the buffer memory 118 is effected, with the CPU 46 applying control signals to the appropriate drivers of the drive means PM of the printing mechanism.

In the next step S107, the WORD-SEPARATION flag 122 is reset to "0". Then, the control returns to step S102. With steps S102–S107 executed repeatedly, successively entered words are checked for their spellings.

If the checking in step S105 reveals that an entered word is misspelled, that is, if a negative decision is obtained in step S105, the control goes to step S108 to activate the alarm buzzer (not shown) for several seconds. In the next step S109, the operation defined by the word-separation data stored in the word-separation data buffer memory 118 is inhibited. Although this step is not in fact present, it is illustrated in the flow chart of FIG. 11, for easy understanding of the inhibition of execution of the word-separation data, as distinguished from the execution thereof in step S106 described above.

Step S109 is followed by step S110 in which the WORD-SEPARATION flag 122 is set to "1". Then, the control returns to step S102.

When the character keys 4, 5, 6 are operated to correct the misspelled word, a negative decision is obtained in step S103, whereby step S103 is followed by steps S111 and S112.

These steps S111 and S112 are provided for deleting, changing and adding characters to correct the misspelled word. In step S111, the WORD-SEPARATION INHIBIT flag 122 is reset to "0", in order to permit the spelling-check operation for the corrected word. In step S112, an operation corresponding to the operated character key or function key is executed. Then, the control returns to step S102.

When the characters of the misspelled word are erased, or new characters are printed, to correct the misspelled word, the letter data corresponding to the erased characters is erased from the word data memory 110, and the newly printed data is stored in the word data memory 110.

When one of the word-separation keys is operated after the misspelled word is corrected, steps S102 through S105 are executed and the corrected word is checked for correctness of the spelling. If the spelling of the corrected word is correct, step S105 is followed by steps S106 and S107, whereby the operation corresponding to the operated word-separation key is accomplished, and then the control returns to step S102.

In the case where a proper noun or name such as a name of a person or place which is not stored in the dictionary memory 102 is entered through the keyboard 3, steps S102-S105 and S108 and S110 are executed. Accordingly, the alarm buzzer is activated, and the operation corresponding to the operated word-separation key is inhibited.

If the same word-separation key as operated to terminate the allegedly misspelled proper noun is operated again, an affirmative decision is obtained in step S104, and the control goes to step S113.

In step S113, the CPU 46 determines whether or not the word-separation key which has been just operated is the same as that which was operated before and whose word-separation data is stored in the buffer memory 118. If the decision in step S113 is negative, an alarm is constituted in step S114, with a buzzer or alarm lamp activated. Step S114 is followed by step S102. If the same word-separation key has been operated, step S113 is followed by step S106, in which the operation corresponding to the twice operated word-separation key is performed. Then, the control returns to step S102.

It follows from the foregoing description that the operation corresponding to the operated word-separation key which terminates an entered word detected as a misspelled word, is not performed, unless the same word-separation key is operated again. Accordingly, if the operated word-separation key is the carriage return key 9, for example, the carriage 27 will not be returned, nor the paper P will be advanced. Thus, the inhibition of execution of the word-separation data permits easy and fast correction of the misspelled word.

Since the word-separation data which terminates the misspelled word is stored in the buffer memory 118, it is possible that the operation defined by the word-separation data stored in the buffer memory 118 is effected even when one of the word-separation keys other than that corresponding to the stored word-separation data is operated after the misspelled word is corrected.

It is also possible that the current position of the carriage 27 at the time of operation of the word-separation key, i.e., a word-separating position is stored in a memory, and the carriage 27 is moved to that word-separating position by operating a re-locate key (not shown) after the misspelled word is corrected with the carriage 27 returned by the backspace key 8, etc. In this case, the operation of the re-locate key will automatically initiate a spelling-check operation of the corrected word, and an operation corresponding to the operated word-separation key if the spelling of the corrected word is correct.

While the illustrated embodiments of the electronic typewriter 1 of the present invention use the typewheel 33, it will be obvious that the principle of the invention is also applicable to a typewriter or printer which has a thermal print head, or printing elements in the form of a ball with integrally formed fonts. Further, the present invention may be embodied as a word processing apparatus having a cathode ray tube (CRT) and a spelling-check function. In this case, the return of the cursor to the first column of the next line, or the movement of the cursor to a preset tab position, is inhibited if the carriage return key or tab key is operated to terminate a detected misspelled word.

While the present invention has been described in its presently preferred embodiments with a certain degree of particularity, it is to be understood that the invention is not limited to the precise details of the illustrated embodiments, but the invention may be embodied with various changes, modifications and improvements which may occur to those skilled in the art, without departing from the spirit and scope of the invention defined in the appended claims.

What is claimed is:

1. A data input and processing apparatus, comprising:
   a keyboard having a plurality of keys operable for entering character data indicative of characters, and word-separation data indicative of termination of entry of a word;
   memory means for storing at least one set of entered word data indicative of a word represented by the character data entered through said keyboard;
   a dictionary memory storing word data indicative of a multiplicity of words;
   spelling-check means responsive to said word-separation data entered through said keyboard, for determining whether or not said dictionary memory stores the word data which is identical with the entered word data in said memory means which was entered last prior to the entry of said word-separation data, and for thereby determining whether or not a spelling of an entered word is correct; and
   inhibiting means responsive to said spelling-check means, for inhibiting an operation defined by said word-separation data if said spelling-check means determines that the spelling of said entered word is not correct.

2. A data input and processing apparatus according to claim 1, further comprising:
   correcting means for correcting said entered word if said spelling-check means determines that the spelling of said entered word is not correct; and
   means for effecting said operation defined by said word-separation data, after the misspelled entered word is corrected by said correcting means.

3. A data input and processing apparatus according to claim 1, further comprising ignoring means for ignoring said spelling-check means and effecting said operation defined by said word-separation data, even if said spelling-check means determines that the spelling of said entered word is not correct.

4. A data input and processing apparatus according to claim 3, wherein said ignoring means is operated when any one of the keys for entering said word-separation data is operated after said spelling-check means determines that the spelling of said entered word is not correct.

5. A data input and processing apparatus according to claim 1, wherein said keyboard has a plurality of word-separation keys for entering said word-separation data, said spelling-check means is operated when one of said word-separation keys is operated, said data input and processing apparatus further comprising means for effecting said operation defined by said word-separation data, when said one of said word-separation keys is operated after said spelling-check means determines that the spelling of said entered word is not correct.

6. A data input and processing apparatus according to claim 1, further comprising mode selecting means for selecting, when said spelling-check means determines that the spelling of said entered word is not correct, one of at least two modes selected from the group which includes (a) an ignoring mode in which said spelling-check means is ignored and said operation defined by said word-separation data is effected, (b) a retyping mode in which said entered word is replaced by a correct word all characters of which are re-entered through said keyboard, (c) an amending mode in which said entered word is corrected by changing and/or deleting at least one of the characters of said entered word, and/or by adding at least one character to said entered word, through said keyboard, and (d) a candidate indication mode in which at least one candidate word which replaces said entered word is displayed on candidate indicator means.

7. A data input and processing apparatus according to claim 1, wherein said plurality of keys of said keyboard include keys for entering letter data indicative of letters, and numeral and/or symbol data indicative of numerals and/or symbols and wherein at least one of said at least one set of entered word data stored in said memory means includes numeral and/or symbol data which precedes and/or follows a series of character data indicative of successive characters, said spelling-check means disregarding said numeral and/or symbol data of the entered word data which precedes and/or follows said series of character data, and determining whether or not the dictionary memory stores the set of character data which is identical with said series of character data, thereby determining whether or not a spelling of said series of character data is correct.

8. A data input and processing apparatus for processing input data, comprising:

a keyboard having a plurality of keys for entering letter data indicative of letters, numerals and/or symbol data indicative of numerals and/or symbols independent of said letter data and attributes for modifying the characteristics of letter, numeral and/or symbol data;

memory means for storing entered data entered through said keyboard, said entered data including numeral and/or symbol data which precedes and/or follows a series of character data indicative of successive characters;

a dictionary memory storing multiple sets of character data indicative of multiple groups of characters;

spelling-check means for disregarding said numeral and/or symbol data of the entered data which precedes and/or follows said series of character data, and determining whether or not the dictionary memory stores the set of character data which is identical with said series of character data, thereby determining whether or not a spelling of said series of character data is correct;

misspelled-word indicator means for displaying, if said spelling-check means determines that the spelling of said entered word is incorrect, said entered word as a misspelled work, together with the numeral and/or symbol which is represented by the disregarded numeral and/or symbol data;

candidate search means for retrieving from said dictionary memory at least one candidate word which replaces said misspelled word; and candidate indicator means for displaying said at least one candidate word, together with the numeral and/or symbol which is represented by the disregarded numeral and/or symbol data, if said entered data stored in said memory means includes said numeral and/or symbol data.

9. A data input and processing apparatus according to claim 8, wherein said dictionary memory stores multiple sets of word data indicative of a multiplicity of words, and said series of character data is a series of letter data indicative of successive letters, said spelling-check means determining whether or not said dictionary memory stores the set of word data which is identical with said series of letter data, and thereby determines whether or not the spelling of an entered word represented by said series of letter data is correct.

10. A data input and processing apparatus according to claim 9, further comprising mode selecting means for selecting, when said spelling-check means determines that the spelling of said entered word is not correct, one of at least two modes selected from the group which includes (a) an ignoring mode in which said spelling-check means is ignored and an operation to enter a next word is permitted, (b) a retyping mode in which said entered word is replaced by a correct word all characters of which are re-entered through said keyboard, (c) an amending mode in which said entered word is corrected by changing and/or deleting at least one of the characters of said entered word, and/or by adding at least one character to said entered word, through said keyboard, and (d) a candidate indication mode in which at least one candidate word which replaces said entered word is displayed on candidate indicator means.

11. A typewriter comprising:

a keyboard having character keys for entering character data indicative of characters, and word-separation keys for entering word-separation data indicative of termination of entry of a word, said word-separation keys including a space key for spacing adjacent words from each other, and a symbol key corresponding to a period;

printing means for printing said characters as said characters are entered through said keyboard;

memory means for storing entered data entered through said keyboard, said entered data including said character data;

a dictionary memory storing word data indicative of a multiplicity of words;

spelling-check means responsive to said word-separation data, for determining whether or not said dictionary memory stores the word data indicative of an entered word which is represented by said character data stored in said memory means and which has been printed by said printing means, and for thereby determining whether or not a spelling of said entered and printed word is correct;

candidate search means for retrieving from said dictionary memory at least one candidate word which replaces said entered and printed word;

commanding means for actuating said candidate search means to retrieve said at least one candidate word, after said spelling-check means determines that the spelling of said entered and printed word is not correct;

erasing means responsive to said commanding means, for erasing said entered and printed word; and selector means which becomes operable, after actuation of the erasing means, but before completion of the erasure of said entered and printed word by said erasing means for selecting one of said at least one candidate word retrieved by said candidate word search means.

12. A typewriter according to claim 11, wherein said character keys include letter keys for entering letter data indicative of letters, and numeral and/or symbol keys for entering numeral and/or symbol data indicative of numerals and/or symbols, said typewriter further comprising:

word-data retrieval means for retrieving from said memory means word data consisting solely of said letter data, where a series of said entered data terminated by said word-separation data includes said numeral and/or symbol data which precedes and/or follows said word data, said spelling-check means determines whether or not the spelling of said entered word represented by said word data is correct.

13. A typewriter according to claim 12, further comprising misspelled-word indicator means for displaying, if said spelling-check means determines that the spelling of said entered word is not correct, said entered word as a misspelled word, together with at least one numeral and/or symbol represented by said numeral and/or symbol data.

14. A typewriter according to claim 12, further comprising candidate indicator means for displaying said at least one candidate word retrieved by said candidate search means, together with at least one numeral and/or symbol which precedes and/or follows said at least one candidate word, if said entered data stored in said memory means includes said numeral and/or symbol data.

15. A typewriter according to claim 12, wherein said printing means is operable to re-print said one of said at least one candidate word retrieved by said candidate search means, together with at least one numeral and/or symbol which precedes and/or follows said one of said at least one candidate word, if said entered data stored in said memory means includes said numeral and/or symbol data.

16. A typewriter according to claim 11, further comprising mode selecting means for selecting, when said spelling-check means determines that the spelling of said entered word is not correct, one of at least two modes selected from the group which includes (a) an ignoring mode in which said spelling-check means is ignored and an operation to enter a next word is permitted, (b) a retyping mode in which said entered word is replaced by a correct word all characters of which are re-entered through said keyboard, (c) an amending mode in which said entered word is corrected by changing and/or deleting at least one of the characters of said entered word, and/or by adding at least one character to said entered word, through said keyboard, and (d) a candidate indication mode in which said at least one candidate word retrieved by said candidate search means is displayed on candidate indicator means, said candidate search means being operable when said candidate indication mode is selected.

17. A typewriter comprising:

a keyboard having a character keys for entering character data indicative of characters, and word-separation keys for entering word-separation data indicative of termination of entry of a word, said word-separation keys including a space key for spacing adjacent words from each other, and a symbol key corresponding to a period;

printing means for printing said characters as said character are entered through said keyboard;

memory means for storing entered data entered through said keyboard, said entered data including said character data;

a dictionary memory storing word data indicative of a multiplicity of words;

spelling-check means responsive to said word-separation data, for determining whether or not said dictionary memory stores the word data indicative of an entered and printed word represented by said character data stored in said memory means, and for thereby determining whether or not a spelling of said entered and printed word is correct;

alarm means for informing an operator of the typewriter that said entered and printed word is misspelled, if said spelling-check means determines that the spelling of said entered and printed word is not correct;

erasing means for erasing said entered and printed word;

display means for displaying said entered and printed word;

mode selecting means operable if said spelling-check means determines that the spelling of said entered and printed is not correct; said mode selecting means selecting one of at least one mode which includes an amending mode in which said entered and printed word is first erased by said erasing means, and then is corrected by changing and/or deleting at least one of the characters of the word displayed on said display means, and/or by adding at least one character to the displayed word, through said keyboard.

18. A typewriter according to claim 17, wherein said mode selector means is operable to change the selected one of said at least two modes to another.

19. A typewriter according to claim 17, wherein said spelling-check means is operable in a spelling-check mode, said typewriter further comprising cancelling means for cancelling said spelling-check mode after said mode selector means has selected one of said at least two modes.

20. A typewriter according to claim 17, further comprising:

misspelled-word indicator means for displaying said entered word as a misspelled word, if said spelling-check means determines that the spelling of said entered word is not correct, said misspelled-word indicator means having a cursor; and means for automatically moving said cursor to a first character of said misspelled word on said misspelled-word indicator means, when said mode selector means selects said amending mode.

21. A typewriter according to claim 17, further comprising:

misspelled-word indicator means for displaying said entered word as a misspelled word, if said spelling-check means determines that the spelling of said entered word is not correct, said misspelled-word indicator means further displaying a corrected word obtained as a result of correcting said misspelled word in said amending mode, said misspelled-word indicator having a cursor;

erasing means for erasing said entered word printed by said printing means; and commanding means for activating said printing means to print said corrected word, when a printing key on said keyboard is operated while said cursor is positioned at one of characters of said corrected word displayed on said misspelled-word indicator means.

22. A typewriter according to claim 17, wherein said at least two modes further includes a candidate indication mode in which at least one candidate word which replaces said entered word is displayed on candidate indicator means, said typewriter further comprising:

candidate search means for retrieving from said dictionary memory at least one candidate word which replaces said entered word and which is displayed on said candidate indicator means; and resetting means for restoring said mode selector means to a condition in which said mode selector means may select any one of said at least two modes, if said dictionary memory does not store said at least one candidate word.

23. A typewriter according to claim 17, wherein said at least two modes further include a candidate indication mode in which at least one candidate word which replaces said entered word is displayed on candidate indicator means, and said typewriter further comprises candidate indicator means for displaying said at least one candidate word in said candidate indication mode, said at least one candidate word remaining on said candidate indication means even after said candidate indication mode is changed to said amending mode, so that any one of said at least one candidate word remaining on said candidate indication means is amended in said amending mode.

24. A typewriter according to claim 17, comprising at least two modes and further includes a retyping mode in which said entered and printed word is first erased by said erasing means, and then replaced by a correct word, all characters of which are re-entered through said keyboard.

25. A typewriter comprising:

a keyboard having character keys for entering character data indicative of characters, and word-separation keys for entering word-separation data indicative of termination of entry of word, said word-separation keys including a space key for spacing adjacent words from each other, and a symbol key printing means for printing said characters entered through said keyboard;

memory means for storing entered data entered through said keyboard, said entered data including said character data;

a dictionary memory storing word data indicative of a multiplicity of words;

spelling-check means responsive to said word-separation data, for determining whether or not said dictionary memory stores the word data indicative of an entered word represented by said character data stored in said memory means, and for thereby determining whether or not a spelling of said entered word is correct;

candidate search means for retrieving from said dictionary memory at least one candidate word which replaces said entered word;

commanding means for actuating said candidate search means to retrieve said at least one candidate word, after said spelling-check means determines that the spelling of said entered word is not correct;

erasing means responsive to said commanding means, for erasing said entered word which has been printed by said printing means;

selector means operable, after erasure of said entered word by said erasing means is started, for selecting one of said at least one candidate word retrieved by said candidate word search means; and inhibiting means responsive to said spelling-check means, for inhibiting an operation defined by said word-separation data, if said spelling-check means determines that the spelling of said entered word is not correct.

* * * * *